United States Patent [19]
Moronaga et al.

[11] Patent Number: 5,956,084
[45] Date of Patent: Sep. 21, 1999

[54] ELECTRONIC STILL-VIDEO CAMERA, AND PLAYBACK APPARATUS THEREFOR BEING CAPABLE OF STORING IMAGE DATA WHEN THE STORAGE CAPACITY OF A MEMORY CARD IS EXCEEDED

[75] Inventors: Kenji Moronaga; Osamu Saito, both of Tokyo, Japan

[73] Assignee: Fuji Photo Film Co., Ltd., Kanagawa, Japan

[21] Appl. No.: 08/432,712

[22] Filed: May 2, 1995

Related U.S. Application Data

[62] Division of application No. 08/163,729, Dec. 9, 1993, Pat. No. 5,473,370, which is a continuation of application No. 07/751,327, Aug. 28, 1991, abandoned.

[30] Foreign Application Priority Data

| Sep. 3, 1990 | [JP] | Japan | 2-233574 |
| Sep. 3, 1990 | [JP] | Japan | 2-233575 |
| Aug. 21, 1991 | [JP] | Japan | 3-232553 |

[51] Int. Cl.[6] .............................. H04N 5/76; H04N 5/222
[52] U.S. Cl. ......................... 348/233; 348/333; 348/372; 358/906; 396/321
[58] Field of Search ................... 348/207, 222, 348/231, 232, 233, 373, 374, 375, 376, 714, 718, 719, 333, 334, 372; 358/335, 336, 342, 344, 906, 909.1; 386/38, 117; 396/321

[56] References Cited

U.S. PATENT DOCUMENTS

| 4,746,993 | 5/1988 | Tada | 358/335 |
| 4,803,554 | 2/1989 | Pape | 358/209 |
| 4,837,628 | 6/1989 | Sasaki | 358/209 |
| 5,016,107 | 5/1991 | Sasson et al. | 358/209 |
| 5,027,214 | 6/1991 | Fujimori | 358/209 |
| 5,032,918 | 7/1991 | Ota et al. | 358/209 |
| 5,034,804 | 7/1991 | Sasaki et al. | 358/41 |
| 5,065,246 | 11/1991 | Takemoto et al. | 358/227 |
| 5,067,029 | 11/1991 | Takahashi | 358/209 |
| 5,086,345 | 2/1992 | Nakane et al. | 358/335 |
| 5,091,787 | 2/1992 | Watanabe et al. | 358/209 |
| 5,153,729 | 10/1992 | Saito | 358/209 |
| 5,153,730 | 10/1992 | Nagasaki et al. | 358/209 |
| 5,212,556 | 5/1993 | Ogawa | 348/207 |
| 5,231,501 | 7/1993 | Sakai | 358/209 |
| 5,481,303 | 1/1996 | Uehara | 348/231 |
| 5,640,203 | 6/1997 | Wakui | 348/231 |
| 5,646,684 | 7/1997 | Nishizawa et al. | 348/231 |

FOREIGN PATENT DOCUMENTS

| 57-78285 | 5/1982 | Japan | H04N 5/76 |
| 59-183582 | 10/1984 | Japan | H04N 5/78 |
| 62-21310 | 5/1987 | Japan | H04N 5/76 |
| 63-284987 | 11/1988 | Japan | H04N 5/907 |
| 1-47177 | 2/1989 | Japan | H04N 5/225 |
| 64-47177 | 2/1989 | Japan | H04N 5/225 |
| 3191680 | 8/1991 | Japan | H04N 5/225 |

*Primary Examiner*—Wendy Garber
*Assistant Examiner*—Ngoc-Yen Vu

[57] ABSTRACT

An electronic still-video camera is provided capable of preserving image data having a quantity which is greater than the storage capacity of a memory cartridge (memory card) loaded in the camera. Besides being capable of receiving an external memory in a memory cartridge loaded in the camera, the camera incorporates an internal memory. Image data obtained as a result of photography is stored in either the internal memory or the external memory, depending upon which memory has been selected by a memory selection switch.

4 Claims, 11 Drawing Sheets

ELECTRONIC STILL-VIDEO CAMERA, AND PLAYBACK APPARATUS THEREFOR BEING CAPABLE OF STORING IMAGE DATA WHEN THE STORAGE CAPACITY OF A MEMORY CARD IS EXCEEDED

This application is a divisional of application Ser. No. 08/163,729 filed on Dec. 9, 1993, U.S. Pat. No. 5,473,370 which is a rule 62 continuation of application Ser. No. 07/751,327 filed Aug. 28, 1991, now abandoned, the entire contents of which are hereby incorporated by reference.

BACKGROUND OF THE INVENTION

1. Field of the Invention

This invention relates to a digital electronic still-video camera for imaging a subject, converting the video signal thus obtained into digital image data and recording the image data in a memory cartridge capable of being loaded and ejected at will, and to a playback apparatus for playing back and displaying the image data resulting from the imaging operation of the digital electronic still-video camera. The memory cartridge mentioned here has the shape of a case or a card incorporating a semiconductor memory and this term is intended to cover means such as a memory card.

2. Description of the Related Art

A camera of the kind described in the specification of Japanese Patent Publication (KOKOKU) No. 62-21310 is a known example of a recent electronic still-video camera. This known electronic still-video camera is adapted to convert a video signal representing the image of a subject into a digital quantity and to store the digital quantity as image data in an internal memory incorporated in the body of the camera. At playback, the image data is read out of the internal memory and sent to a playback apparatus via a connector. The playback apparatus converts the provided image data into a video signal and applies the video signal to a display unit. As a result, a still picture is displayed on the display unit.

In another example of an electronic still-video camera described in the specification of Japanese Patent Application Laid-Open (KOKAI) No. 59-183582, the image data is recorded in a memory cartridge capable of being loaded in and ejected from the camera body at will.

The first example of the electronic still-video camera mentioned above is convenient because it is unnecessary for the user to carry about a separate memory cartridge. However, the number of frames capable of being photographed is limited by the storage capacity of the internal memory of the camera, and it is not possible to perform photography beyond the number of frames decided by the storage capacity of the internal memory. Using an internal memory having a large storage capacity permits more photography but raises the cost of the camera. In addition, there is a limit upon the storage capacity of the internal memory, and therefore in practical use there is no assurance that the internal memory will always have the capacity to preserve all of the frames desired to be shot.

In the second example of the electronic still-video camera described above, an advantage is that preparing the necessary number of memory cartridges makes it possible to perform photography without any limitation being imposed on the number of frames that can be shot. However, the user must carry about a memory cartridge even if the number of frames planned on being shot is small. Furthermore, after a memory cartridge has been filled to capacity with the image data, photography cannot be performed unless the memory cartridge is exchanged for a new one.

Further, with the first example of the electronic still-video camera, a separate playback apparatus is necessary in order to read and reproduce the image data from the internal memory of the camera. Likewise, the second example of the electronic still-video camera requires a separate playback apparatus in order to read and reproduce the image data obtained by the camera and stored in the memory cartridge.

A disadvantage encountered above is that the playback apparatus for the first example of the electronic still-video camera and the playback apparatus for the second example of the electronic still-video camera have connectors of different types, and therefore the cameras cannot share the same playback apparatus. Accordingly, in a case where two types of electronic still-video cameras are used for photography, two types of playback apparatus also are required. This is inconvenient and disadvantageous in terms of handling and storage space. In addition, the fact that two types of playback apparatus must be purchased is costly and is a serious drawback economically speaking.

SUMMARY OF THE INVENTION

Accordingly, an object of the present invention is to provide an easy-to-carry electronic still-video camera capable of performing photography without any limitation upon the number of frames.

Another object of the present invention is to provide an electronic still-video camera in which, even if the number of recordable frames left in a memory cartridge has become zero, at least one more frame can be shot without replacing the memory cartridge.

A further object of the present invention is to provide a playback apparatus capable of being used to reproduce image data stored in both the internal memory and external memory (a memory cartridge) of an electronic still-video camera.

An electronic still-video camera according to a first aspect of the present invention comprises image pick-up means for picking up an image of a subject and outputting a video signal representing the image of the subject obtained, recording signal processing means for converting the video signal outputted by the image pick-up means into digital image data suited for storage in a memory, an internal memory for storing the image data, a first connector in and from which a memory cartridge is capable of being loaded and unloaded at will, the memory cartridge incorporating an external memory for storing the image data, and write control means for writing the image data, which has been outputted by the recording signal processing means, in either the internal memory or the external memory.

In an embodiment of the invention, the image data is written first in the internal memory until the internal memory is filled to capacity, and then in the external memory, by the write control means.

In another embodiment of the invention, the electronic still-video camera further comprises memory selecting means for selecting either the internal memory or the external memory. The image data is written in the memory selected by the memory selecting means.

The electronic still-video camera also comprises means for displaying the number of recordable frames left in the internal memory or the external memory, and means for displaying the number of frames of image data stored in the internal memory or external memory.

In a preferred embodiment, the electronic still-video camera according to the first aspect of the present invention further comprises read control means for reading out the image data stored in the internal memory or the external memory, playback processing means for converting the image data read out by the read control means into a video signal suited for display, and outputting this video signal, and a second connector, to which an external display unit is capable of being connected, for supplying the display unit with the video signal outputted by the playback processing means.

In another preferred embodiment, the electronic still-video camera according to the first aspect of the present invention additionally comprises read control means for reading out the image data stored in the internal memory or the external memory, and a third connector, to which an external playback apparatus is capable of being connected, for supplying the playback apparatus with the image data read out by the read control means.

An electronic still-video camera according to a first aspect of the present invention comprises an internal memory for storing image data, a first connector, in and from which a memory cartridge is capable of being loaded and unloaded at will, the memory cartridge incorporating an external memory for storing the image data, read control means for reading out the image data stored in the internal memory or the external memory, playback processing means for converting the image data read out by the read control means into a video signal suited for display, and outputting this video signal, and a second connector, to which an external display unit is capable of being connected, for supplying the display unit with the video signal outputted by the playback processing means.

In another embodiment of the invention, the electronic still-video camera further comprises memory selecting means for selecting either the internal memory or the external memory. The image data is read out of the memory selected by the memory selecting means.

The electronic still-video camera also comprises means for designating a frame number of the image data to be read out of the memory.

The electronic still-video camera additionally comprises a third connector, to which an external playback apparatus is capable of being connected, for supplying the playback apparatus with the image data read out by the read control means.

An electronic still-video camera according to a first aspect of the present invention comprises an internal memory for storing image data, a first connector, in and from which a memory cartridge is capable of being loaded and unloaded at will, the memory cartridge incorporating an external memory for storing the image data, read control means for reading out the image data stored in the internal memory or the external memory, and a second connector, to which an external playback apparatus is capable of being connected, for supplying the playback apparatus with the image data read by the read control means.

In a preferred embodiment, the electronic still-video camera further comprises memory selecting means for selecting either the internal memory or the external memory. The image data is read out of the memory selected by the memory selecting means.

The electronic still-video camera further comprises means for designating a frame number of the image data to be read out of the memory.

The electronic still-video camera also comprises playback processing means for converting the image data read out by the read control means into a video signal suited for display, and outputting this video signal, and a third connector, to which an external display unit is capable of being connected, for supplying the display unit with the video signal outputted by the playback processing means.

In accordance with the first aspect of the present invention, a memory cartridge incorporating an external memory is loaded in the camera, thereby making it possible to shoot a number of frames beyond the storage capacity (the number of photographable frames) of the internal memory. In a case where the volume of image data for the required number of photographic frames is less than the capacity of the internal memory, it is unnecessary for the user to bring along a memory cartridge. Accordingly, the electronic still-video camera is highly portable. In addition, since it is unnecessary to rely solely upon the internal memory in order to shoot all of the desired number of photographic frames, it is possible to hold down the price of the camera. At playback, image data stored not only in the internal memory but also in the external memory can be played back by the playback processing means and reproduced on the display screen of the display unit. Of course, it is possible also to read the image data out of the external memory or internal memory and send this image data to the external playback apparatus.

A playback apparatus for an electronic still-video camera according to a second aspect of the present invention comprises a first connector capable of being connected to the electronic still-video camera for accepting image data outputted upon being read out of a memory of the electronic still-video camera, a second connector capable of being connected to a memory cartridge for accepting image data outputted upon being read out of a memory within the memory cartridge, playback means for converting the image data, with which it has been provided, into a video signal suited for display, and connector selecting means for selecting either the first connector or the second connector and providing the playback means with the image data supplied through the connector selected.

In a preferred embodiment, the playback apparatus further comprises a third connector for connecting a display unit provided with the video signal outputted by the playback means.

The playback apparatus also comprises image designating means for designating image data to be read out of the memory of the electronic still-video camera or the memory of the memory cartridge.

The electronic still-video camera comprises an internal memory for storing the image data, a connector for connecting a memory cartridge which incorporates an external memory for storing the image data, memory selecting means for selecting read-out of the image data from the internal memory or the external memory, and image data reading means for reading and outputting designated image data from the memory selected by the memory selecting means.

The playback apparatus further comprises means for commanding read-out of image data from the internal memory or the external memory of the electronic still-video camera.

In a preferred embodiment according to the second aspect of the present invention, the playback apparatus has a first control panel which includes the connector selecting means, and the electronic still-video camera has a second control panel for commanding operation of the camera. The playback apparatus further comprises operation selecting means for enabling an operating input from one of the first and second control panels and disabling an operating input from the other of the first and second control panels, and causing the playback apparatus to perform an operation, which has been commanded by an operating input, in response to the operating input from the enabled control panel.

In another embodiment according to the second aspect of the invention, the playback apparatus further comprises a fourth connector for receiving an input of an externally applied video signal, and recording means for converting the video signal inputted from the fourth connector into image data, and storing the image data in the electronic still-video camera or the memory of the memory cartridge via the first or second connector.

In accordance with the second aspect of the present invention, the electronic still-video camera is connected to the first connector, the memory cartridge is connected to the second connector, and the first or second connector is connected to the playback means by the connector selecting means. As a result, the image data read out via the connector can be played back and displayed on the display unit. Accordingly, the image data recorded in the electronic still-video camera and in the memory cartridge can be played back using a single playback apparatus.

In accordance with the embodiment of the second aspect of the invention, memory selection and playback can be controlled by the user using the first control panel of the playback apparatus or the second control panel of the electronic still-video camera.

In accordance with the other embodiment of the second aspect of the invention, a video signal from a VTR or the like inputted from the fourth connector is converted into image data, and the image data can be stored in the electronic still-video camera or the memory cartridge via the first or second connector. This makes it possible to reproduce the recorded contents of a video tape of the like.

An electronic still-video camera according to a third aspect of the present invention comprises image pick-up means for picking up an image of a subject and outputting a video signal representing the image of the subject obtained, recording signal processing means for converting the video signal outputted by the image pick-up means into digital image data suited for storage in a memory, and for compressing the digital image data, an internal memory for storing the compressed image data, a first connector in and from which a memory cartridge is capable of being loaded and unloaded at will, the memory cartridge incorporating an external memory for storing the compressed image data, and write control means for writing the compressed image data, which has been outputted by the recording signal processing means, in either the internal memory or the external memory.

In an embodiment according to the third aspect of the present invention, the electronic still-video camera further comprises memory selecting means for selecting either the internal memory or the external memory. The compressed image data is written in the memory selected by the memory selecting means.

It is particularly preferred that the electronic still-video camera also comprises means for displaying the number of recordable frames left in the internal memory or the external memory, and means for displaying the number of frames of image data stored in the internal memory or external memory.

In another embodiment, the electronic still-video camera comprises read control means for reading out the compressed image data stored in the internal memory or the external memory, and playback processing means for expanding the compressed image data read out by the read control means, converting the expanded image data into a video signal suited for display, and outputting this video signal.

The electronic still-video camera further comprises a second connector, to which an external display unit is capable of being connected, for supplying the display unit with the video signal outputted by the playback processing means.

The electronic still-video camera also comprises a display unit for displaying an image represented by the video signal outputted by the playback processing means.

In another embodiment of the present invention, the electronic still-video camera additionally comprises means for transferring the compressed image data from the internal memory to the external memory, or vice versa.

The electronic still-video camera further comprises means for designating the compressed image data to be transferred.

The transfer means may be adapted to transfer all of the compressed image data stored in the internal memory or external memory.

An electronic still-video camera according to a third aspect of the present invention comprises an internal memory for storing compressed image data, a first connector in and from which a memory cartridge is capable of being loaded and unloaded at will, the memory cartridge incorporating an external memory for storing the image data, read control means for reading out the compressed image data stored in the internal memory or the external memory, and playback processing means for expanding the compressed image data read out by the read control means, converting the expanded image data into a video signal suited for display, and outputting this video signal.

In a preferred embodiment, the electronic still-video camera further comprises memory selecting means for selecting either the internal memory or the external memory. The compressed image data is read out of the memory selected by the memory selecting means.

In an embodiment according to the third aspect of the present invention, the electronic still-video camera also comprises a second connector, to which an external display unit is capable of being connected, for supplying the display unit with the video signal outputted by the playback processing means.

According to another embodiment, the electronic still-video camera additionally comprises a display unit for displaying an image represented by the video signal outputted by the playback processing means.

An electronic still-video camera according to a third aspect of the present invention comprises image pick-up means for picking up an image of a subject and outputting a video signal representing the image of the subject obtained, recording signal processing means for converting the video signal outputted by the image pick-up means into digital image data suited for storage in a memory, and for compressing the digital image data, an internal memory for storing the compressed image data, a connector in and from which a memory cartridge is capable of being loaded and unloaded at will, the memory cartridge incorporating an external memory for storing the compressed image data, write control means for writing the compressed image data outputted by the recording signal processing means in either the internal memory or external memory, and means for transferring the compressed image data from the internal memory to the external memory or vice versa.

In a preferred embodiment, the electronic still-video camera further comprises means for designating the compressed image data to be transferred.

The transfer means may be adapted to transfer all of the compressed image data stored in the internal memory or external memory.

In accordance with the third aspect of the present invention, photography is possible without carrying about a memory cartridge, just as in the first aspect of the present invention. The data representing the acquired image is capable of being stored in the internal memory. The image data that has been stored in the internal memory can be transferred to the external memory of the memory cartridge and therefore is capable of being preserved in the external memory. Naturally, in a case where the number of photographs is large, the memory cartridge is loaded so that the photographic image data can be preserved in the memory cartridge. Since the image data is subjected to compression processing, memory capacity can be utilized very effectively.

An electronic still-video camera according to a fourth aspect of the present invention comprises image pick-up means for picking up an image of a subject and outputting a video signal representing the image of the subject obtained, recording signal processing means having a frame memory for converting the video signal outputted by the image pick-up means into digital image data suited for storage in a memory, and for compressing the digital image data, a connector in and from which a memory cartridge is capable of being loaded and unloaded at will, the memory cartridge incorporating an external memory for storing the compressed image data, sensing means for sensing that the memory cartridge has been connected to the connector, determining means for determining that compressed image data can no longer be recorded in the memory cartridge connected to the connector, and control means, when it has been determined by the determining means that the compressed image data can no longer be recorded in the memory cartridge after the digital image data, which has been obtained by image pick-up performed by the image pick-up means and results from the conversion performed by the recording signal processing means, and has been stored in the frame memory, operable for performing control in such a manner that the image data stored in the frame memory is written in a new memory cartridge once it has been confirmed based upon information from the sensing means that the memory cartridge has been replaced by the new memory cartridge.

In an embodiment according to the fourth aspect of the present invention, the recording signal processing means includes a Y/C processing circuit for generating luminance data and color data from the digital image data, and a compressing circuit for compressing the image data after it has been subjected to Y/C processing. Once the image data subjected to Y/C processing has been preserved in the frame memory and replacement of the memory cartridge has been confirmed, the image data is compressed and then recorded in the new memory cartridge.

In another embodiment, the electronic still-video camera further comprises means for displaying a memory-cartridge replacement request when it has been determined by the determining means that compressed image data is no longer capable of being recorded in the memory cartridge.

In a preferred embodiment, the electronic still-video camera also comprises means for cancelling automatic turn-off of power when a memory-cartridge replacement request has been displayed by the display means.

An electronic still-video camera according to a fourth aspect of the present invention comprises image pick-up means for picking up an image of a subject and outputting a video signal representing the image of the subject obtained, recording signal processing means having a frame memory for converting the video signal outputted by the image pick-up means into digital image data suited for storage in a memory, and for compressing the digital image data, a connector in and from which a memory cartridge is capable of being loaded and unloaded at will, the memory cartridge incorporating an external memory for storing the compressed image data, sensing means for sensing that the memory cartridge has been connected to the connector, and control means, when it has been sensed by the sensing means that the memory cartridge has not been connected to the connector after the digital image data obtained by image pick-up performed by the image pick-up means and resulting from conversion performed by the recording signal processing means has been stored in the frame memory, which is operable for performing control in such a manner that the image data stored in the frame memory is written in a memory cartridge once it has been confirmed by the sensing means that the memory cartridge has been connected to the connector.

In accordance with the fourth aspect of the present invention, a frame memory essential for digital signal processing within the digital electronic still-video camera is utilized. As a result, if it is desired to perform photography beyond an already fixed number of photographic frames of the memory cartridge, at least one frame can be preserved temporarily irrespective of the size of the compression ratio. In addition, even if a memory cartridge has not been loaded in the camera, image data resulting from photography can be preserved in the frame memory temporarily. By operating the camera in such a manner that the temporarily preserved image data is recorded in a new memory cartridge when the new memory cartridge has been loaded in the camera, the operator's task is simplified greatly.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Embodiments of the present invention will now be described in detail with reference to the drawings.

First Embodiment

Figure 1:
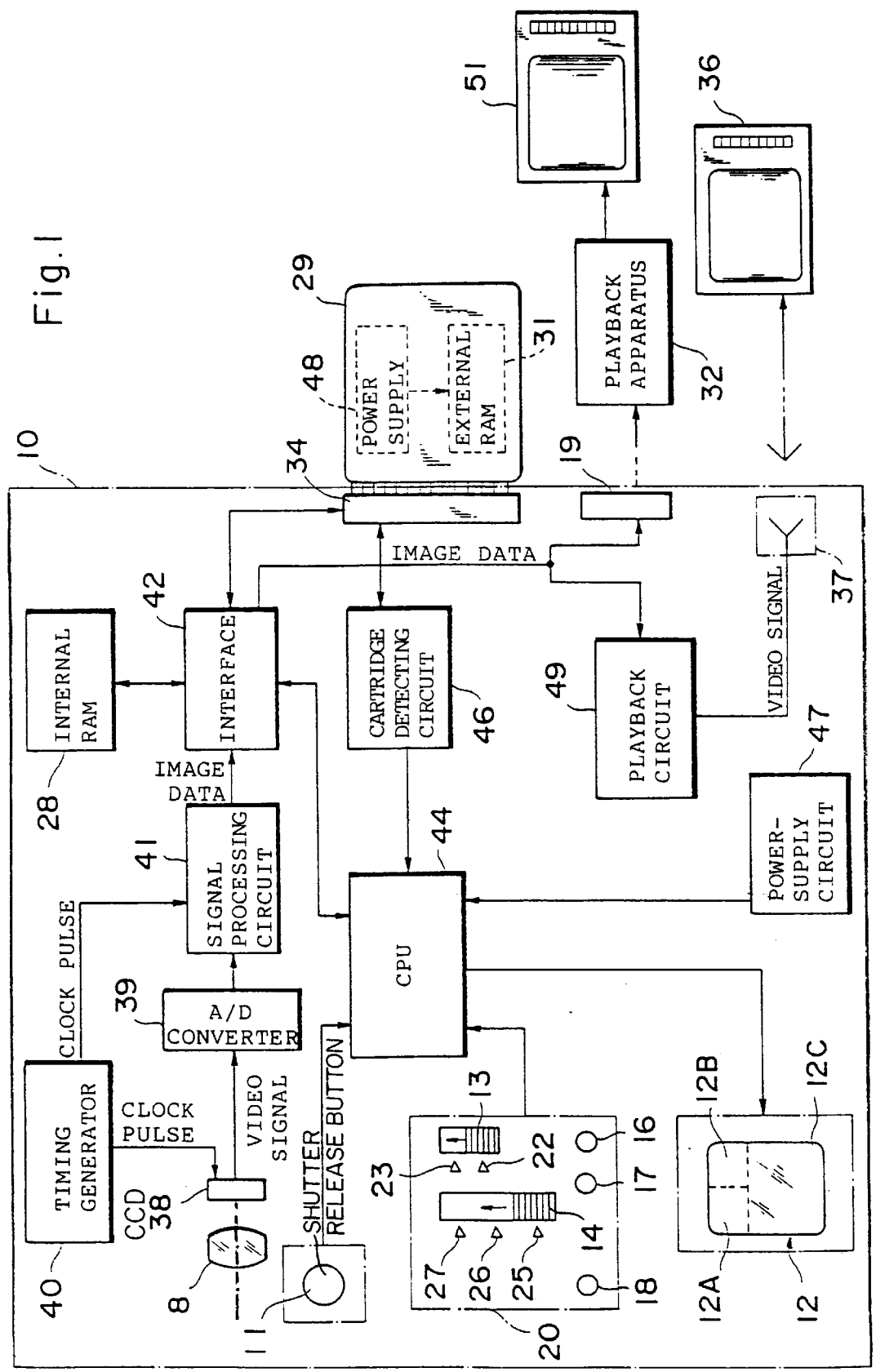
FIG. 1 is a block diagram illustrating the electronic circuitry of an electronic still-video camera according to a first embodiment of the present invention.
Figure 2:
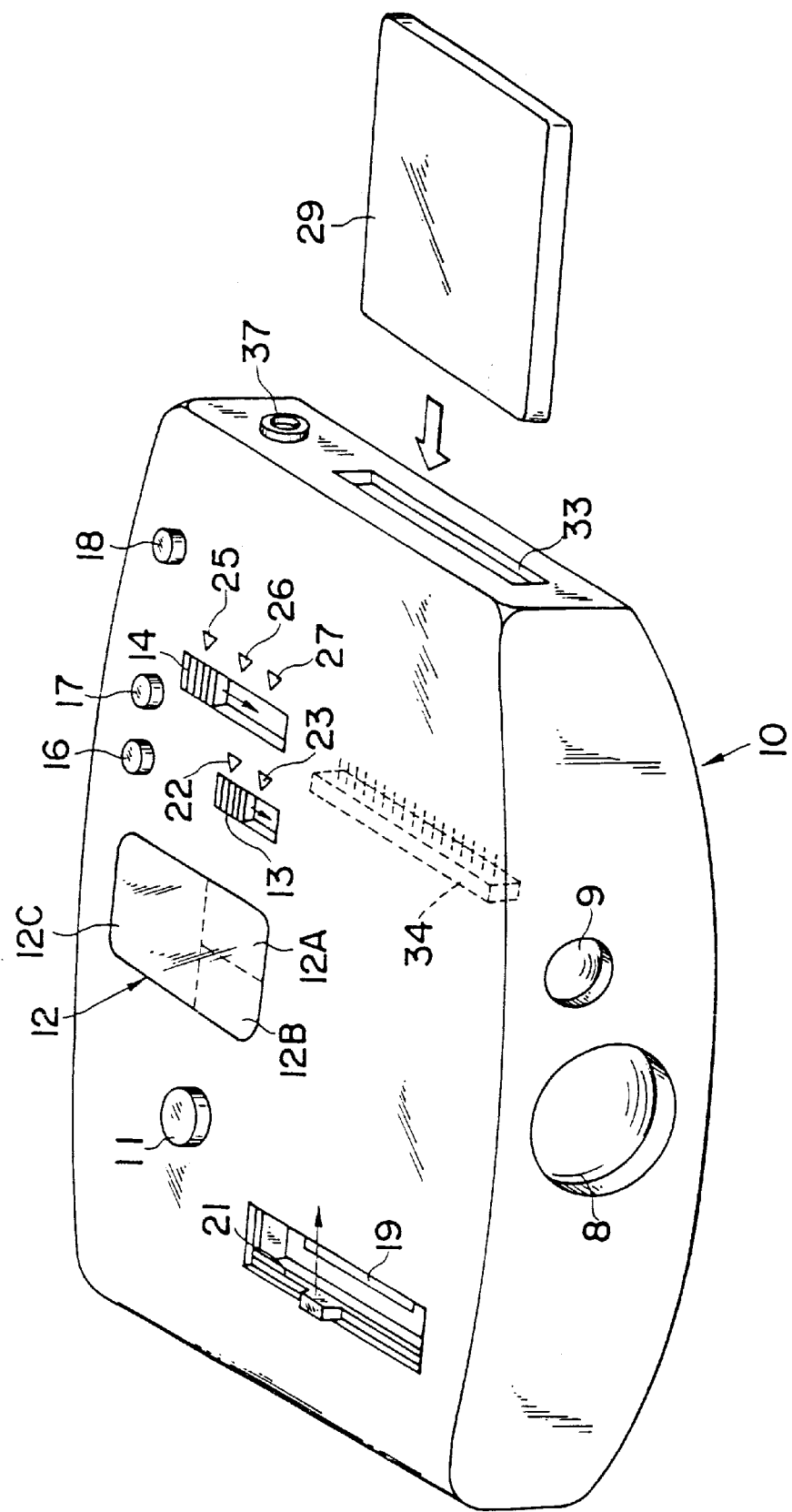
FIG. 2 is an external perspective view of the electronic still-video camera.

An electronic still-video camera 10 according to a first embodiment of the present invention has a photographic lens 8 and a finder lens 9 provided on its front side, as illustrated in FIG. 2. A shutter-release button 11 and a liquid-crystal display device 12 are provided on the top side of the electronic still-video camera 10. The display panel of the liquid-crystal display device 12 is divided into three display sections 12A, 12B and 12C. Disposed alongside the liquid-crystal display device 12 is a control panel (indicated by numeral 20 in FIG. 1) which includes a memory selecting switch 13, a main switch 14, a forward button 16, a reverse button 17 and an erase button 18. An accommodating recess for a connector 19, which connects an external playback apparatus 32 (see FIG. 1), is open and shut by sliding a cover 21.

When the memory selecting switch 13 is set at the position of an indicator mark 22, an internal RAM 28 incorporated within the camera 10 is selected, as shown in FIG. 1. When the memory selecting switch 13 is set at the position of an indicator mark 23, an external RAM 31 within a memory cartridge 29 is selected. Thus, it is possible for image data to be stored in or read out of the selected RAM. In this embodiment, the RAMs 28 and 31 each have a storage capacity of 12 photographic frames.

When the main switch 14 is set at the position of an indicator mark 25, the main electronic circuitry within the camera 10 ceases operating, and operating power is supplied solely to the minimum required circuitry, such as a circuit needed to maintain the data stored in the internal RAM 28. This makes it possible to minimize power consumption. When the main switch 14 is changed over to the position of an indicator mark 26, this establishes an image playback mode. Changing over the main switch 14 to the position of an indicator mark 27 establishes an image recording mode.

One side of the electronic still-video camera 10 has an opening 33 into which the memory cartridge 29 is inserted. Provided within the interior of the opening 33 is a connector 34 for connecting the memory cartridge 29. A connector 37 for connecting an external monitor (see FIG. 1) for image playback is provided alongside the opening 33.

When the shutter-release button 11 is pressed, a timing generator 40 shown in FIG. 1 generates a clock pulse. In response to the clock pulse, a CCD 38 outputs a video signal representing the image of a subject photographed. The video signal is converted into digital data by an A/D converter 39, and the digital data is supplied to a signal processing circuit 41. The signal processing circuit 41 separates color infor- mation and luminance information of each pixel from the video signal and produces image data by combining these items of information with address information of each pixel generated based upon the clock pulse and a dot clock signal. The image data is directed through an interface 42 to be stored in the internal RAM 28 or the external RAM 31, depending upon the setting of the memory selecting switch 13.

The states of the various buttons and switches on the control panel 20 are constantly being monitored by a CPU 44. If the shutter-release button 11 is pressed when the indicator mark 27 has been selected by the main switch 14, one frame of image data resulting from photography is transferred from the interface 42 to either the internal RAM 28 or the external RAM 31. When the indicator mark 25 or 26 has been selected by the main switch 14, depression of the shutter-release button 11 is considered an invalid opera- tion and no clock pulse is generated by the timing generator 40.

A cartridge detector circuit 46 connected to the connector 34 detects loading of the memory cartridge 29 and sends a signal indicative thereof to the CPU 44. The latter reads the header information of the storage area of the external RAM 31 in the memory cartridge 29 via the interface 42 and, based upon the header information, recognizes the number of photographable frames left in the external RAM 31 of the memory cartridge 29 and the number of already photo- graphed frames stored in the external RAM 31. Power necessary for backing up the external RAM 31 is supplied by a battery in a power-supply circuit 48 incorporated in the memory cartridge 29.

Figure 3A:
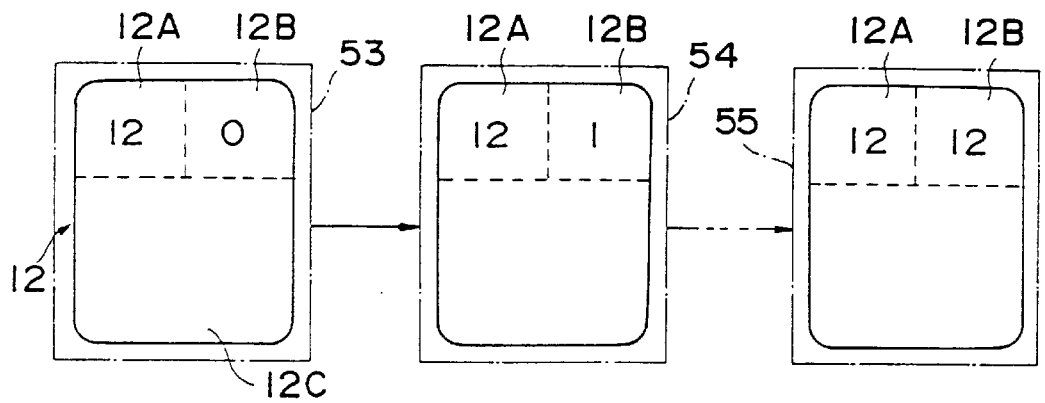
FIGS. 3a through 3c are diagrams illustrating examples of displays which appear on a liquid-crystal display device of the electronic still-video camera.

FIG. 3a illustrates examples of displays presented on the liquid-crystal display device 12 when the memory cartridge 29 has not been loaded. In examples 53, 54 and 55, the number "12" of photographable frames conforming to the storage capacity of the internal RAM 28 is displayed in the display section 12A. In examples 54 and 55, the number of photographed frames already stored in the internal RAM 28 is displayed in display section 12B. The number of photo- graphed frames is incremented from "0" to "1", "1" to "2" and so on, up to "12", each time a frame is shot.

Figure 3B:
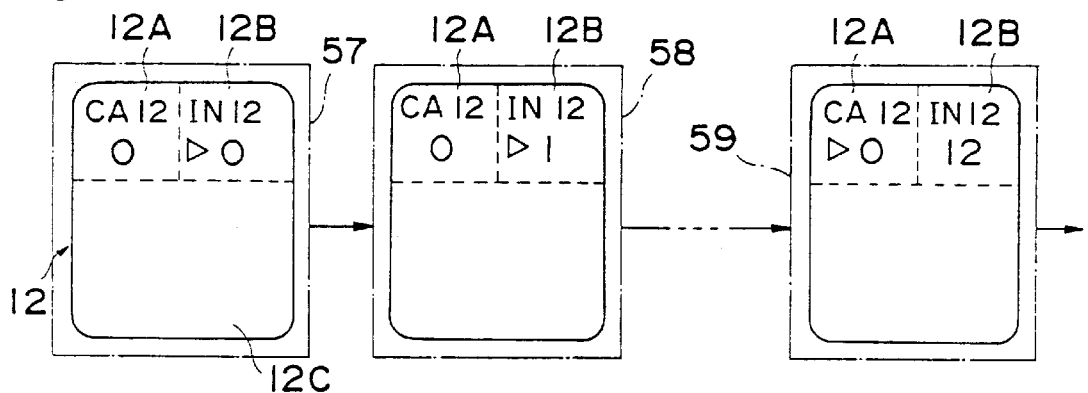

When the memory cartridge 29 has been loaded, the display on the liquid-crystal display device 12 changes over, as shown in FIG. 3b.

In display example 57, the indication "CA 12" in the display section 12A indicates that the number of photo- graphable frames in memory cartridge 29 is 12. The under- lying numeral "0" indicates that the number of shot frames already stored in the memory cartridge 29 is 0.

The indication "IN 12" which appears in the display section 12B indicates that the number of photographable frames in the internal RAM 28 is 12. The underlying numeral "0" indicates that the number of shot frames already stored in the internal RAM 28 is 0. The mark " ▷ " to the left of "0" means that if the shutter-release button 11 is pressed under these conditions, the first frame of image data repre- senting the image of the photographed subject will be recorded in the internal RAM 28. If photography continues in this manner, the display will change as shown in display examples 58 and 59 in FIG. 3b.

Figure 3C:
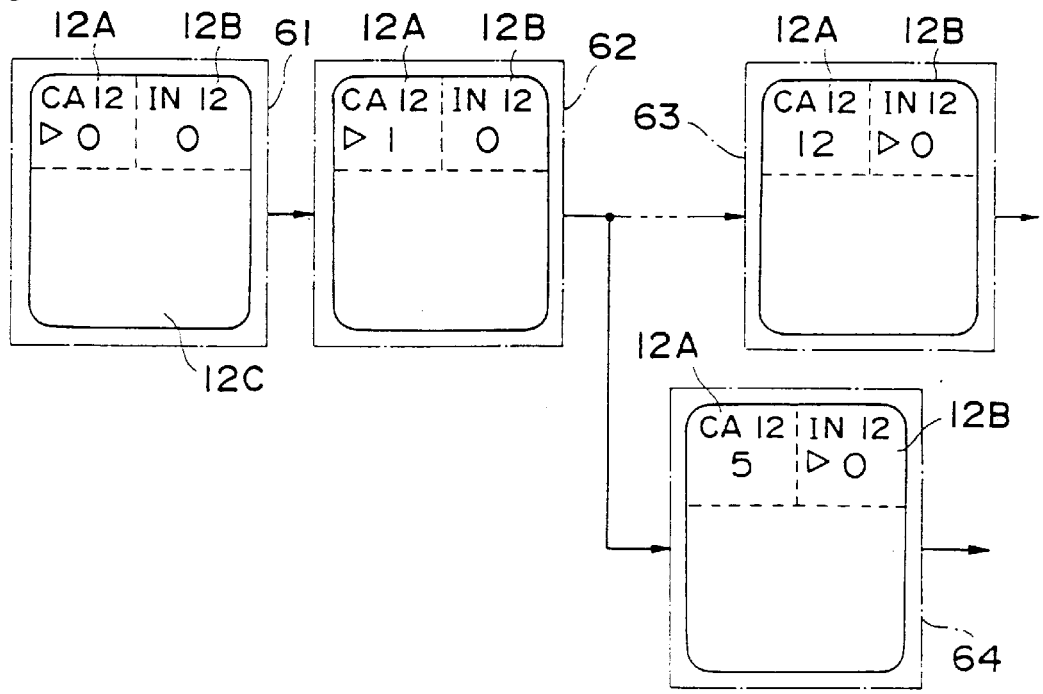

If the memory selecting switch 13 is changed over to the position of indicator mark 23 when the display of example 57 is in effect, the mark " ▷ " moves to the display section 12A, as depicted in display example 61 of FIG. 3c. The display example 61 indicates that if photography is per- formed by pressing the shutter-release button 11, the first frame of image data resulting from photography will be stored in the external RAM 31 within the memory cartridge 29. If photography continues, the number of shot frames changes from the display example 61 to display example 63 via display example 62. When the number of shot frames recorded in the external RAM 31 reaches the number 12 of photographable frames, the mark "▷" moves to the display section 12B (display example 63) corresponding to the internal RAM 28 (which still has storage capacity available), even if the memory selecting switch 13 is not changed over. If the memory selecting switch 13 is changed over to the position of indicator mark 22 in mid course, the image data resulting from photography can be stored in the internal RAM 28 so that some storage capacity is left in the external RAM 31, as illustrated in display example 64.

Each frame of image data stored in the RAM 28 or 31 has a frame number assigned thereto by the CPU 44 in accordance with the order in which pictures are taken. The display section 12C displays information indicating, for example, that the battery within the power-supply circuit 47 is running low on energy.

The display on the liquid-crystal display device 12 associated with the operation of the memory selecting switch 13 is presented in a similar manner in the image playback mode as well. In the playback mode the numerals underlying "CA 12" or "IN 12" indicate the frame number, in the external RAM 31 or the internal RAM 28, of the image currently being displayed on a monitor display unit 36 or 51. Depending upon whether the mark "▷" is being displayed in the display section 12A or 12B, the mark indicates that the image currently being displayed on the display monitor has been read out of the internal RAM 28 or the external RAM 31.

Each time the forward button 16 is pressed, the frame number is incremented and the image data of this frame number is read out of the internal RAM 28 or the external RAM 31 and displayed on the monitor. When the reverse button 17 is pressed, the frame number is decremented in successive fashion. If the forward button 16 or the reverse button 17 is pressed and held, frames of image data are displayed on the monitor one after another rapidly in the forward or reverse direction, respectively.

If the shutter-release button 11 is pressed while the erase button 18 is held depressed in the playback mode, the image data of the frame currently appearing on the monitor is erased from the internal RAM 28 or the external RAM 31.

When the main switch 14 is set at the position of indicator mark 26, the image playback mode is established, as described above, the image data in the internal RAM 28 or the external RAM 31 is read out via the interface 42, and the read image data is sent. to a playback circuit 49 and the connector 19. The playback circuit 49 converts the digital image data read out of the internal RAM 28 or the external RAM 31 into analog image data and produces a composite video signal which includes horizontal and vertical synchronizing signals formed from address information. This video signal is applied to the external monitor display unit 36 connected to the connector 37. As a result, a reproduced image represented by the video signal appears on the display unit 36. The external playback apparatus 32 connected to connector 19, besides executing processing similar to that of the playback circuit 49, is capable of executing processing for changing the color tone of the image appearing on the monitor display unit 51 or for converting a color image to a black-and-white image.

The operation of the first embodiment will now be described.

In a case where the user expects that the number of frames to be shot will be 12 or less, the user needs to carry only the electronic still-video camera 10 and is not required to take along the memory cartridge 29.

When a picture is to be taken, first the main switch 14 is changed over from the position of indicator mark 25 to the position of indicator mark 27. As a result, "12" is displayed in the display section 12A and "0" in the display section 12B of the liquid-crystal display device 12, as illustrated by display example 53 in FIG. 3a. This indicates that the number of photographable frames in the internal RAM 28 is 12 and that the number of shot frames is 0. When the shutter-release button 11 is pressed to shoot the first frame, the image data of Frame No. 1 is stored in the internal RAM 28 and the numeral in the display section 12B changes to "1". The numeral appearing in the display section 12B is incremented whenever the shutter-release button 11 is pressed. When this number attains the number "12" appearing in the display section 12A, the number of photographable frames and the number of already shot frames in the internal RAM 28 coincide. This means that no further photography is possible. When photography ends, the main switch 14 is changed over to the position of indicator mark 25 to prevent consumption of the power supply.

When the main switch 14 is changed over to the position of the indicator mark 26, the circuit is placed in the playback mode and the display presented on the liquid-crystal display device 12 takes on the form of display example 53 in FIG. 3a. When the monitor display unit 36 is connected to the connector 37, the screen of the display unit 36 goes blank. When the for-ward button 16 is pressed one time, the display section 12B displays "1" and the monitor display unit 36 displays the image of Frame No. 1 among the twelve frames that have been shot. By subsequently pressing the forward button 16 or reverse button 17, images having different frame numbers are displayed on the monitor display unit 36 one after another and the frame numbers of the respective images are displayed in the display section 12B. If the frame number of the image desired to be displayed is known, the forward button 16 or reverse button 17 is pressed to display the frame number in the display section 12B, thereby making it possible to retrieve the desired image based solely upon the frame number. By connecting the playback apparatus 32 to the connector 19, the image having the same frame number as that displayed on the monitor display unit 36 can be displayed in a different form on the other monitor display unit 51.

If the number of frames to be shot is expected to be large or is not known, the required number of memory cartridges is carried along with the electronic still-video camera 10. To perform photography, the main switch 14 is changed over from the position of indicator mark 25 to that of indicator mark 27 to establish the image recording mode. At this time a display of the kind illustrated by display example 53 appears on the liquid-crystal display device 12.

When the memory cartridge 29 is loaded from the opening 33 and connected to the connector 34, the cartridge detector circuit 46 outputs a detection signal. By setting the memory selecting switch 13 to the position of indicator mark 22, the display presented by the liquid-crystal display device 12 changes to the display example 57 of FIG. 3b.

When the shutter-release button 11 is pressed, the first frame of image data resulting from photography is stored in the internal RAM 28, and the numeral underlying "IN 12" in display section 12B changes to "1" (display example 58). If photography is continued, the numeral underlying "IN 12"

is incremented. When shooting of the 12th frame ends, the numeral underlying "IN 12" becomes "12", which is equal to the number of photographable frames in the internal RAM 28. At this time, the mark "▷" moves to the display section 12A, as shown in display example 59, and image data resulting from photography from the 13th frame onward is recorded in the external RAM 31 in memory cartridge 29.

If the memory cartridge 29 has been loaded and the memory selecting switch 13 is changed over from the position of indicator mark 22 to that of indicator mark 23, the mark "▷" moves from the display section 12B to the display section 12A, as illustrated by display example 61 in FIG. 3c. Each time the shutter-release button 11 is pressed under these conditions, each frame of image data is stored in the external RAM 31 and the numeral underlying "CA 12" is incremented. When shooting of the 12th frame ends, the number of shot frames reaches the number of photographable frames in the external RAM 31. Accordingly, the mark "▷" moves from the display section 12A to the display section 12B and frames shot from the 13th onward are recorded in the internal RAM 28.

If the user does not wish to record image data in the internal RAM 28, the memory cartridge 29 is replaced by an unused one, thereby allowing photography to resume while leaving the internal RAM 28 unused. The image data resulting from the resumed photography can thus be stored in the newly loaded memory cartridge 29. When the new memory cartridge 29 is loaded, the display on the liquid-crystal display device 12 becomes as illustrated by display example 61 in FIG. 3c.

If photography is resumed with the memory selecting switch 13 left set at the position of indicator mark 23 and the memory selecting switch 13 is then changed over to the position of indicator mark 22 when the fifth frame is shot, for example, the display on the liquid-crystal display device 12 becomes as illustrated by display example 64. By subsequently pressing the shutter-release button 11, the sixth frame of image data can be recorded in the internal RAM 28 as image data of Frame No. 1.

If the memory cartridge 29 has been loaded, the main switch 14 is set at the position of indicator mark 26 and the memory selecting switch 13 is set at the position of the indicator mark 22, the liquid-crystal display device 12 presents the display illustrated by display example 57. In display example 57, the mark "▷" resides in the display section 12B, thereby indicating that the playback of data performed from this point onward will be image data stored in the internal RAM 28. By pressing the forward button 16, the image represented by the image data of Frame No. 1 stored in the internal RAM 28 is displayed. The image displayed on the monitor display unit 36 can be selected by subsequently operating the forward button 16 or reverse button 17.

If the external RAM 31 is selected by changing over the memory selecting switch 13, the mark "▷" moves to the display section 12A and the images that have been recorded in the external RAM 31 can be played back.

In a case where only one frame of image data no longer needed is erased, the main switch 14 is set at the position of indicator mark 26 to establish the playback mode and the image of the frame to be erased is displayed on the monitor by operating the forward button 16 or reverse button 17. If the shutter-release button 11 is pressed while holding down the erase button 18 under these conditions, this frame of image data is erased and the image data corresponding to this frame number is cleared from the RAM. Accordingly, the next time a picture is taken, new image data can be recorded at the recording position having this frame number.

If the frame number of the image to be erased is evident, this frame number can be selected and its corresponding image erased while observing the display on the liquid-crystal display device 12, without presenting a display on the monitor.

In the embodiment described above, the arrangement is such that the RAM which records the image data can be selected by the memory selecting switch 14. However, it is permissible to adopt an arrangement in which the first through 12th frames of image data are always recorded in the internal RAM 28 and images from the 13th frame onward, which exceeds the number of photographable frames in the internal RAM 28, are recorded in the external RAM 31 of the memory cartridge 29. As a result, an object of the present invention is attained by a simplified operation.

As will be illustrated by a third embodiment set forth below, it can be so arranged that a selector and a command switch for copy or transfer are provided, and the image data that has been stored in the internal RAM 28 is directed through the selector and transferred for storage to the external RAM 31 of the memory cartridge 29 when a copy or transfer command is issued by the command switch. It is possible also to perform transfer and storage in the opposite direction, namely from the external RAM 31 to the internal RAM 28. In this case, it would be desirable if it were possible to designate the frame number of the image data to be transferred.

Second Embodiment

A playback apparatus 110 for an electronic still-video camera according to a second embodiment of the present invention has an opening 113 provided in its front side for inserting and ejecting a memory cartridge 112. The memory cartridge 112 incorporates an external RAM 114 for storing image data. Connectors 116 and 117 are disposed on the right side of the opening 113. The connector 116 is an image-data input terminal for use in the playback mode, and the connector 117 is a video-signal input terminal for use in the recording mode.

The electronic still-video camera 10 is the same as that of the first embodiment discussed above, and portions identical with those shown in FIGS. 1 and 2 are designated by like reference characters and need not be described again. The electronic still-video camera 10 is provided with a connector 37A for input/output of image data. The connector 37A and connector 116 are connected by a cable 118, thereby interconnecting the camera 10 and the playback apparatus 110. The memory cartridge 29 inserted into and ejected from the electronic still-video camera 10 and the memory cartridge 112 inserted into and ejected from the playback apparatus 110 are the same. In other words, the memory cartridge 112 can be used with the camera 10, and the memory cartridge 29 can be used with the playback apparatus 110.

If the electronic still-video camera 10 and the playback apparatus 110 are connected by the cable 118, the electronic still-video camera 10 is placed in the recording mode and the shutter-release button 11 is pressed under these conditions, the usual photography is not carried out. Rather, image data inputted from the playback apparatus 110 is stored in the internal RAM 28 or the external RAM 31 via the cable 118.

The right side of the playback apparatus 110 is provided with a connector 132 for outputting a video signal. A monitor display unit 135 connected to the connector 132 displays an image represented by the video signal outputted by the playback apparatus 110.

The top side of the playback apparatus 110 is provided with a control panel 139 (see FIG. 4) and a warning lamp 141. The control panel 139 includes a main switch 133, a connector selecting switch 134, an operation selecting switch 136, a forward button 137, a reverse button 138 and a recording button 131.

Figure 4:
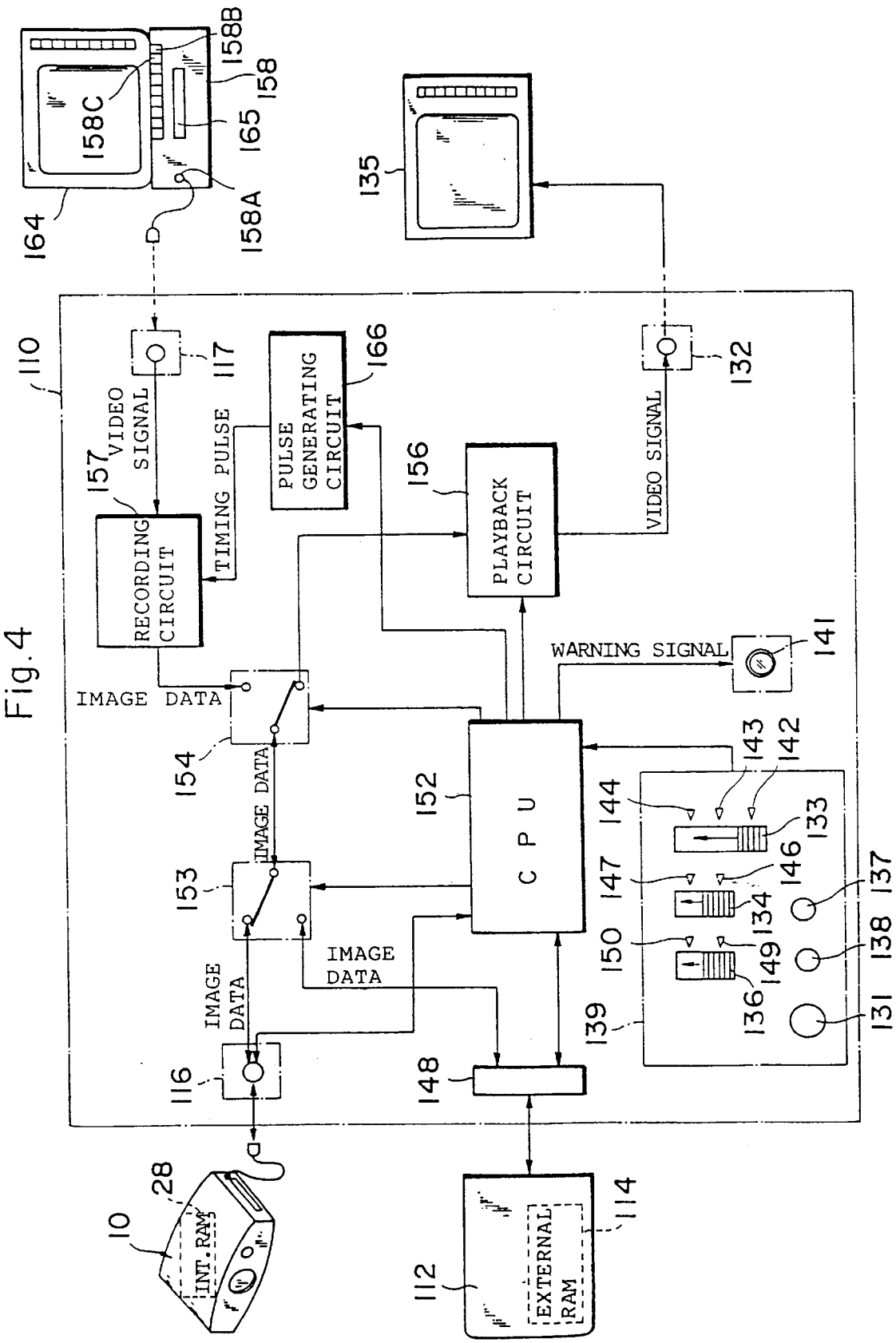
FIG. 4 is a block diagram illustrating the electronic circuitry incorporated within a playback apparatus for an electronic still-video camera according to a second embodiment of the present invention.
Figure 5:
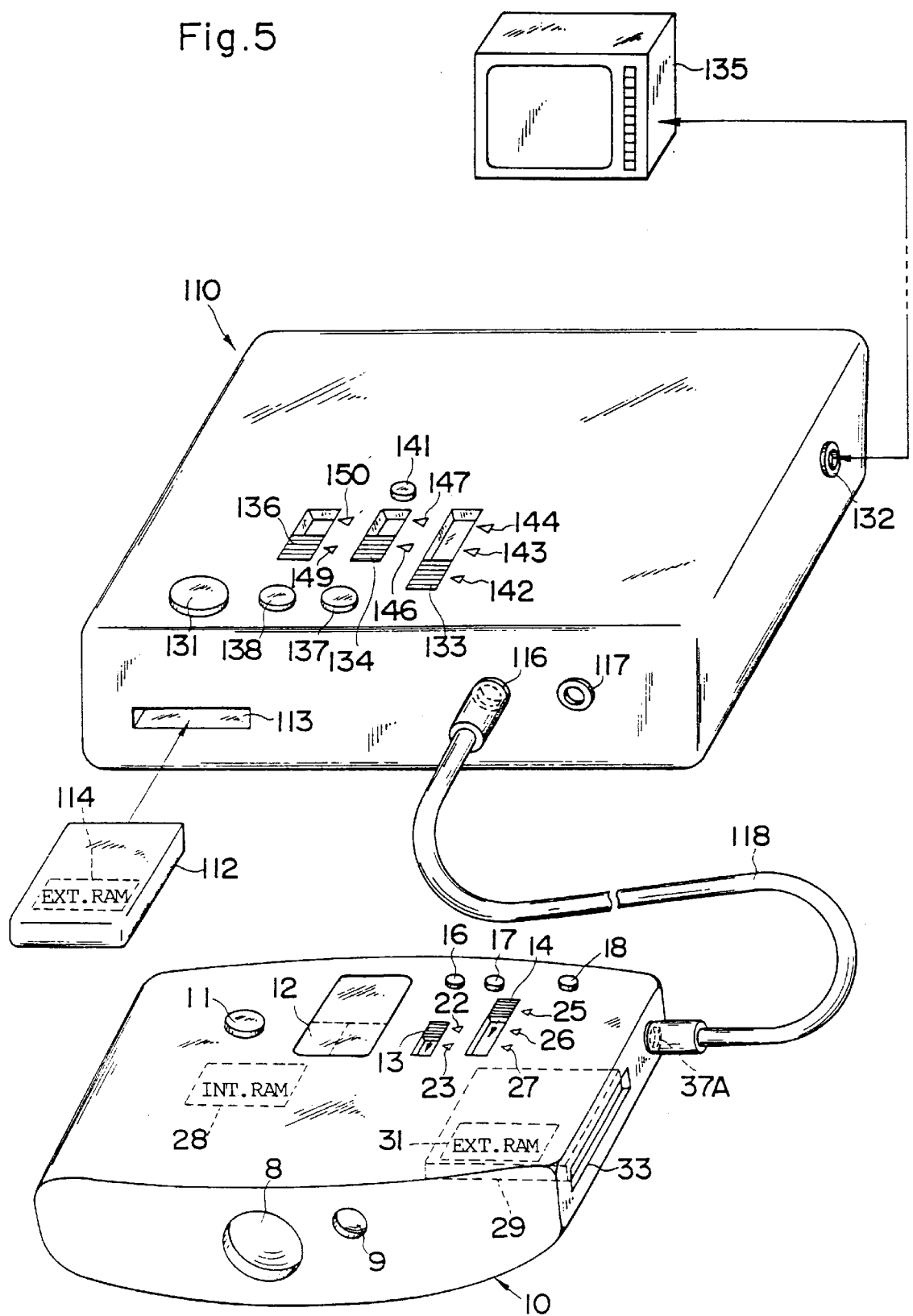
FIG. 5 is an external perspective view of the electronic still-video camera and playback apparatus.

By setting the main switch 133 at the position of an indicator mark 142, 143 or 144, as shown in FIG. 4, the electronic circuitry within the playback apparatus 110 is placed in an off state, playback mode or recording mode, respectively.

If the connector selecting switch 134 is set at the position of the indicator mark 146, the connector 116 is selected and image data is accepted via this connector. If the connector selecting switch 134 is set at the position of the indicator mark 147, a connector 148 is selected and image data is accepted via this connector. The memory cartridge 112 that has been loaded in the opening 113 is connected to the connector 148. A CPU 152 senses whether a connection has been made to the connector 116 for the electronic still-video camera 10 or the connector 148 for the memory cartridge 112. If the electronic still-video camera 10 or memory cartridge 112 has not been connected to the selected connector 116 or 148, the warning lamp 141 is lit by a warning signal produced by the CPU 152 to inform the user of the situation.

The operation selecting switch 136 is for enabling operation of the control panel 20 of electronic still-video camera 10 or operation of the control panel 139 of the playback apparatus 110 if the electronic still-video camera 10 has been connected to the connector 116. If the switch 136 is at the position of indicator mark 149, operation of the control panel of playback apparatus 110 is enabled and operation of the control panel of electronic still-video camera 10 is disabled. If the switch 136 is at the position of indicator mark 150, operation of the control panel of electronic still-video camera 10 is enabled and operation of the control panel 139 of the playback apparatus 110 is disabled.

More specifically, the CPU 44 of the electronic still-video camera 10 and the CPU 152 of the playback apparatus 110 are interconnected via the cable 118. The CPUs 44 and 152 inform each other of the states of the read input signals from the respective control panels 20 and 139. Accordingly, depending upon the setting of the operation selecting switch 136, it is possible to control the playback apparatus 110 from the control panel 20 of the electronic still-video camera 10 and, conversely, it is possible to control the electronic still-video camera 10 from the control panel 139 of the playback apparatus 110.

If the forward button 137 is pressed with the main switch 133 set at the position of the indicator mark 143, image data having a frame number incremented by one is read out and played back from the image data that has been stored in the internal RAM 28 of electronic still-video camera 10 or in the external RAM 114 of memory cartridge 112. Conversely, pressing the reverse button 138 causes image data having a frame number decremented by one to be played back. By holding down the button 137 or 138 continuously, images to be played back are fed successively frame by frame in the forward or reverse direction, respectively.

When the electronic still-video camera 10 and memory cartridge 112 are connected to the connectors 116 and 148, respectively, this condition is sensed by the CPU 152. The CPU 152 controls the circuitry in the electronic still-video camera 10 or memory cartridge 112 via the connector 116 or 148 to perform read-out of the necessary image data, RAM selection, etc. Image data supplied via the connector 116 or 148 is selected in a selector 153 under the control of the CPU 152, and the selected image data is supplied to the playback circuit 156 via a selector 154.

A pulse generating circuit 166 applies a timing pulse to a recording circuit 157 when the recording button 131 is pressed. The timing pulse stipulates the timing at which the recording circuit 157 is to process a video signal corresponding to one image.

The playback circuit 156 performs a digital-to-analog conversion on various information possessed by the image data and produces a composite video signal which includes horizontal and vertical synchronizing signals formed from address information. This video signal is applied to the monitor display unit 135 via the connector 132. As a result, an image represented by the video signal appears on the screen of the display unit 135.

The recording circuit 157 performs an operation which is the reverse of that executed by the playback circuit 156. Specifically, a composite video signal acquired from a VTR (video tape recorder) 158 via the connector 117 is converted from an analog to digital signal in units of one image and separated into various items of information to produce image data. This image data is stored in the internal RAM 28 of electronic still-video camera 10 or in the external RAM 114 of memory cartridge 112 via the selectors 154 and 153.

When the image playback mode is established by pressing a playback switch 158B on the VTR 158 connected to the connector 117, a moving picture recorded on a video tape 165 is played back and displayed on the screen of a monitor display unit 164. A video signal representing the moving picture appearing on the display screen is outputted from a video-signal output terminal 158A of the VTR 158 and supplied to the connector 117. The moving picture is composed of a number of collected still pictures of individual images (scanning time: 1/60 sec). Video signals representing the individual still pictures are continuously supplied to the recording circuit 157 via the connector 117.

Ordinarily, the recording circuit 157 does not process the supplied video signal. When the pulse generating circuit 166 outputs a timing pulse in response to depression of the recording button 131, the recording circuit 157 is placed in a signal-standby state in order to begin recording processing. In response to attainment of this state and detection of the vertical synchronizing signal of the video signal initially supplied, the recording circuit 157 starts video-signal processing and then ends this processing in response to detection of the next vertical synchronizing signal. As a result, only a video signal corresponding to one image is converted into digital image data. The operating states of the control panel 139, such as depression of the recording button 131, are scanned by the CPU 152 at all times.

The VTR 158 is provided with a temporary-stop switch 158C. By pressing this switch, one desired image stored in a frame memory within the VTR 158 can be "frozen" on the monitor screen, and output of the video signal representing this image can be made to continue in repetitive fashion. By pressing the recording button 131 while an image is frozen on the monitor screen, the data indicative of the frozen image can be recorded and reproduced in the playback apparatus 110 in a reliable manner.

The operation of the second embodiment constructed as set forth above will now be described.

At playback, the connector 37A of the electronic still-video camera 10, in which image data has been stored in the internal RAM 28 and the external RAM 31, and the connector 116 of the playback apparatus 110 are connected by the cable 118. The memory cartridge 112 is loaded from the opening 113 and connected to the connector 148. Furthermore, the monitor display unit 135 is connected to the connector 132. The operation of the control panel 139 is enabled by setting the operation selecting switch 136 to the position of indicator mark 149. Thereafter, the main switch 133 is changed over from the position of indicator mark 142 to that of the indicator mark 143, whereby the selector 154 selects the side of the playback circuit 156. As a result, the electronic circuitry of the playback apparatus 110 is placed in the playback mode.

If the connector selecting switch 134 has been set at the position of the indicator mark 146, the selector 153 selects the side of the connector 116 and image data outputted by the electronic still-video camera 10 is accepted. This image data is supplied to the playback circuit 156 via the selectors 153, 154, whereby the data is converted into an analog video signal suitable for display. The monitor display unit 135, which has been supplied with the video signal via the connector 132, projects a still picture represented by the video signal on its monitor screen. The frame number of the image being displayed on the monitor appears on the liquid-crystal display device 12 of the electronic still-video camera 10.

The image being displayed on the monitor can be selected from the internal RAM 28 or the external RAM 31 by operating the forward button 137 or reverse button 138 while observing the image displayed on the monitor. If the forward button 137 is held depressed, the image of Frame No. 1 in the internal RAM 28 is displayed on the monitor first, followed by images having successively larger frame numbers. Following the image having the last frame number in the internal RAM 28, the images in the external RAM 31 are displayed on the monitor one after another starting from Frame No. 1. The images can be displayed on the monitor in the order of successively smaller frame numbers by pressing the reverse button 138.

If the connector selecting switch 134 has been set at the position of the indicator mark 147, the selector 153 selects the side of the memory cartridge 112. Image data is accepted from the external RAM 114 in the memory cartridge 112. The image represented by the image data that has been recorded in the memory cartridge 112 is displayed on the monitor display unit 135, just as described above.

In a case where solely the electronic still-video camera 10 or memory cartridge 112 is connected to connector 116 or 114, image data accepted from the connector which the connection has been made can be played back by selecting this connector by means of the connector selecting switch 134. However, when the connector to which the connection has been made is not selected, the CPU 152 will light the warning lamp 141, in order to inform the user that playback as selected is impossible, if the connector selecting switch 134 is set at the position of the indicator mark 146 with the memory cartridge 112 having been connected to the connector 148 and the electronic still-video camera 10 having not been connected to the connector 116, by way of example.

At recording, the video-signal output terminal 158A of the VTR 158 is connected to the connector 117, and the main switch 133 is set at the position of the indicator mark 144. As a result, the selector 154 selects the side of the recording circuit 157 in response to a command from the CPU 152, and the electronic circuitry of the playback apparatus 110 is placed in the recording mode.

The connector 116 or 148 is selected by the connector selecting switch 134. The VTR 158 is placed in an image playback state when the playback switch 158B is pressed. If the temporary-stop switch 158C is pressed while the image playback state is in effect, the image prevailing at this time is frozen on the screen of the monitor display unit 164. The video signal of the still picture being displayed on the monitor is supplied continuously to the recording circuit 157 via the video-signal output terminal 158A and connector 117.

If the recording button 131 is pressed while the video signal of one desired image is being supplied continuously to the recording circuit 157, the pulse generating circuit 166 supplies the recording circuit 157 with a timing pulse. The recording circuit 157 which has been supplied with the timing pulse begins processing for converting the video signal into image data in response to detection of the vertical synchronizing signal. This processing stops in response to detection of the next vertical synchronizing signal. The image data corresponding to one image thus obtained is directed through the selector 154 and supplied to the connector 116 or 148 selected by the selector 153. This data is stored in the internal RAM 28 (or the external RAM 31) or in the external RAM 114. Operation of the warning lamp 141 in the recording mode is similar to that in the playback mode.

In a case where the operation selecting switch 136 has been set at the position of indicator mark 150, the selector 153 selects the side of connector 116. With the exception of the operation selecting switch 136, operation of the control panel 139 is disabled and operation of the electronic still-video camera 10 is enabled.

When the main switch 14 of the electronic still-video camera 10 is set at the position of indicator mark 26, the CPU 152 responds by causing the selector 154 to select the playback circuit 156 and places the electronic circuitry of the playback apparatus 110 in the playback mode. Now, by operating the memory selecting switch 13, either the internal RAM 28 or external RAM 31 is selected, and the frame number is selected by operating the forward button 16 or the reverse button 17. The image data of the frame number thus selected is read out of the internal RAM 28 or the external RAM 31, and the image represented by read data is displayed on the screen of the monitor display unit 135.

By setting the main switch 14 at the position of the indicator mark 27, the selector 154 selects the side of the recording circuit 157 and the electronic circuitry of the playback apparatus 110 is placed in the recording mode. If the VTR 158 is operated under these conditions to display a desired still picture on the monitor display unit 164, the video-signal output terminal 158A will continuously deliver an output of the video signal indicative of this still picture. By pressing the shutter-release button 11, the recording circuit 157 is supplied with timing pulses from the pulse generating circuit 166 and converts the input video signal into image data. This image data is supplied to the electronic still-video camera 10 via the selectors 154 and 153, and the image data is recorded in either the internal RAM 28 or external RAM 31, depending upon the setting of the memory selecting switch 13.

By changing over the operation selecting switch 136 to the position of the indicator mark 149, operation of the control panel 139 is enabled and operation of the electronic still-video camera 10 is disabled.

Figure 6:
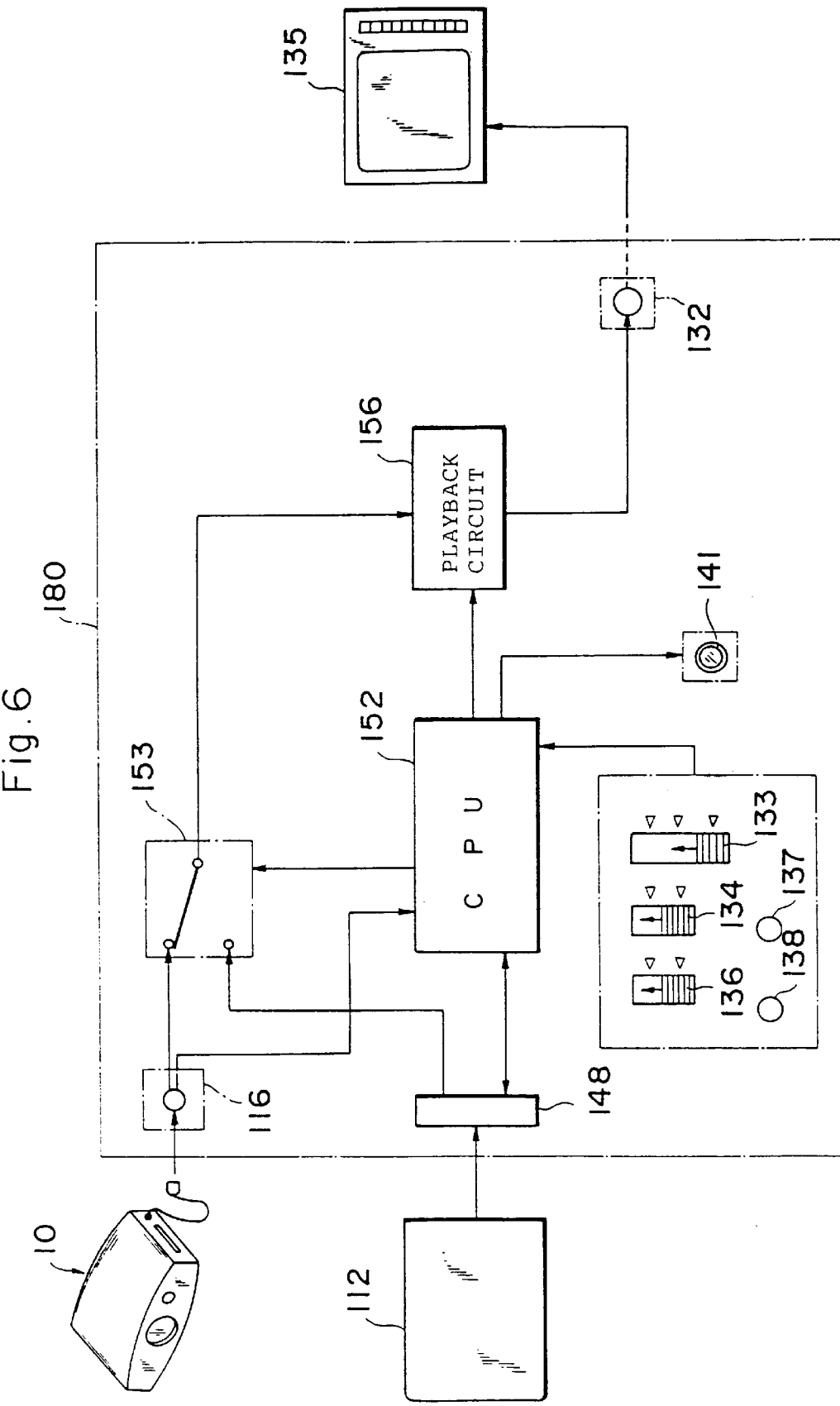
FIG. 6 is a block diagram illustrating the electronic circuitry of the playback apparatus according to a modification of the present invention.

According to this embodiment, the recording circuit 157 is provided in the electronic circuitry of the playback apparatus 110. However, it is possible to eliminate the recording circuit 157 to obtain a playback apparatus 180, of the kind shown in FIG. 6, which performs playback processing only.

Third Embodiment

Figure 7:
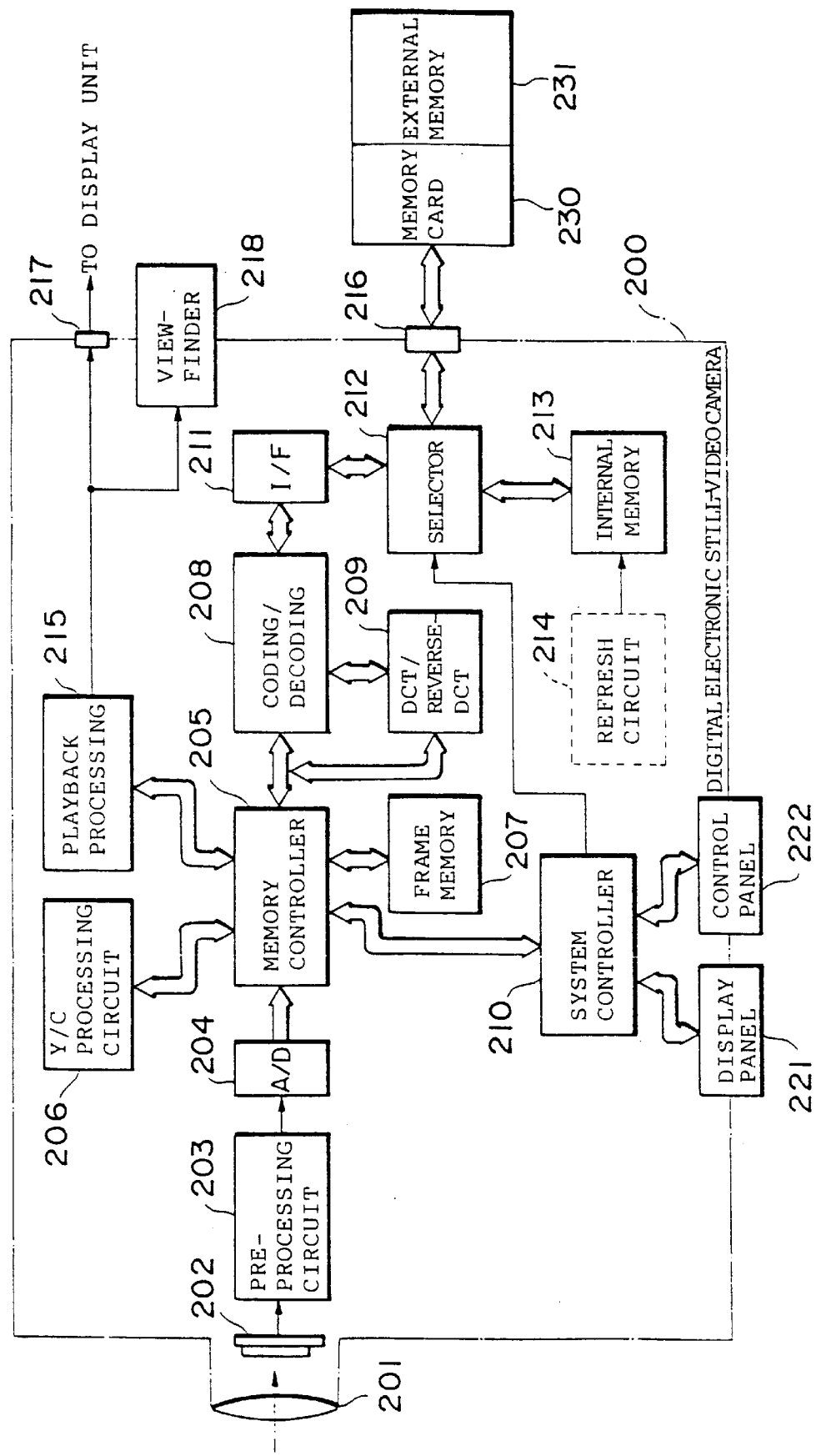
FIG. 7 is a block diagram illustrating the electrical construction of a digital electronic still-video camera according to a third embodiment of the present invention.

FIG. 7 illustrates the construction of a digital electronic still-video camera according to a third embodiment of the present invention. Though it has not been stated explicitly in the first and second embodiments, the image data generally is subjected to data-compression processing before being stored in the external RAM of the memory cartridge or in the internal RAM of the electronic still-video camera. The reason for this is that the image data is highly voluminous and a large number of frames of image data cannot be stored in a semiconductor memory unless the data is compressed. When the image data that has been stored in these memories is played back, the compressed image data is subjected to expansion processing.

Image data generally is composed of luminance data Y and color data Cr, Cb. Each of these items of image data Y, Cr, Cb is subjected to compression and expansion processing individually.

In this embodiment, a two-dimensional orthogonal transformation coding method is used to accomplish compression of the image data. Since the compression processing regarding each of the items of image data Y, Cr and Cb is the same (though naturally the values of the parameters used in the compression processing differ), compression of only one type of image data, e.g., the luminance data Y, will be described.

The image data is divided into a plurality of blocks. For example, one block is composed of 8 dots×8 dots. The image data in each block is subjected to a two-dimensional orthogonal transformation (e.g., a two-dimensional discrete cosine transformation, referred to as "DCT"). The data that has been orthogonally transformed is normalized using a predetermined normalization coefficient (i.e., the data is divided using a normalization coefficient), and data of a value smaller than the normalization coefficient is discarded and made 0 (this is quantization processing). The quantized data is then subjected to Huffman coding.

The processing for expanding the compressed image data is performed through a procedure which is the reverse of the foregoing. Specifically, first the compressed image data is decoded and then the decoded data is subjected to a two-dimensional orthogonal reverse transformation. Finally, the image data that has been expanded block by block is combined (arrayed) in memory so as to construct one picture.

When a digital electronic still-video camera 200 shown in FIG. 7 is in the recording mode, the image of a subject formed on a solid-state electronic image pick-up element such as a CCD through an imaging optical system 201 is converted into an electric signal at the moment a shutter-release button (not shown) is pressed, and the electric signal is outputted by a CCD 202. The video signal representing the image of the subject outputted by the CCD 202 is subjected to pre-processing such as amplification and white-balance adjustment in a pre-processing circuit 203. The resulting signal is then converted into digital image data in an A/D converter circuit 204, and the digital image data is stored temporarily in a frame memory 207 via a memory controller 205. In FIG. 7, a circuit which controls the timing of read-out from the CCD 202 as well as other operations is not shown.

The image data temporarily stored in the frame memory 207 is read out in the order of sequential scanning under the control of the memory controller 205. The read image data is fed into a luminance-signal/color-signal (Y/C) processing circuit 206 following a frame/field conversion if this is necessary. The luminance-signal/color-signal processing circuit 206 generates the luminance (Y) data and color (C=Cr+Cb) data from the inputted image data. These items of luminance data and color data are applied to the frame memory 207 to be stored there again.

Thereafter, the image data is read out of the frame memory 207 again and applied to a DCT/reverse-DCT circuit 209. The latter compresses the image data by the aforementioned DCT and expands the image data by the aforementioned reverse-DCT. As a result of the DCT conversion, the amount of data in one frame of image data is reduced, and therefore the number of frames capable of being recorded in an external memory 231 of a memory card 230 or an internal memory 213 of the camera increases. The compressed image data is applied to the frame memory 207 to be stored there again.

The compressed image data is read out of the frame memory 207 and applied to the coding/decoding circuit 208. While the compressed image data is being coded by the coding/decoding circuit 208, it is directed through a card interface 211 and stored in the external memory 231 of the memory card 230 or the internal memory 213 of the electronic still-video camera 200, depending upon the selection made by the selector 212. The selector 212 is controlled by a system controller 210.

As in the first and second embodiments described above, the electronic still-video camera 200 has a connector 216 for connecting the memory cartridge 230 at will. When the memory cartridge 230 is connected via the connector 216, the external memory 231 in the memory card 230 is capable of being accessed by the system controller 210 of the electronic still-video camera 200.

The digital electronic still-video camera 200 is equipped with the internal memory 213. The internal memory 213 is constituted by a semiconductor memory, which is the external memory 231, and should have a storage capacity as large as practically possible. The internal memory 213 can be a static RAM or, in order to obtain a high density and speed, a dynamic RAM. If a dynamic RAM is used, a refresh circuit 214 will be required.

In the playback mode, an image having a designated frame number is read out of the external memory 231 or internal memory 213 from the compressed image data stored in these memories. After being subjected to playback processing, the read image data is either displayed in a viewfinder (constituted by a liquid-crystal display device, for example) 218 or applied to an external display unit via a connector 217. The connector 217 is for connecting the external display unit.

More specifically, the compressed image data read out of the external memory 231 or the internal memory 213 is applied to the coding/decoding circuit 208 via the selector 212 and interface 211, the data is decoded and the decoded data is stored in the frame memory 207. Thereafter, the image data is read out of the frame memory 207 and applied to the DCT/reverse-DCT circuit 209, where the data is subjected to a reverse-DCT. After the transformed image data is again temporarily stored in the frame memory 207, the transformed image data is read out of the frame memory 207 and applied to a playback processing circuit 215. The playback processing circuit 215 converts the inputted digital image data into an analog video signal and outputs the signal upon converting it into a signal suitable for displaying. The analog video signal is applied to the viewfinder 218 to display the image, or is directed through the connector 217 so as to be applied to an external display unit (not shown), where the image is displayed. With regard to the output of the analog video signal, it goes without saying that a changeover switch can be provided for changing over between the connector 217 and the viewfinder 218. Of course, the video signal may be applied to both the connector 217 and viewfinder 218 simultaneously.

The system controller 210 executes control of the memory controller 205 for compressing and expanding the image data in the manner described above; changeover control of the selector 212; control for changeover between the recording and playback modes; control for accessing the internal memory 213 and the external memory 231 and designating frame numbers; and control of display panel 221 and control panel 222, described below.

Figure 8:
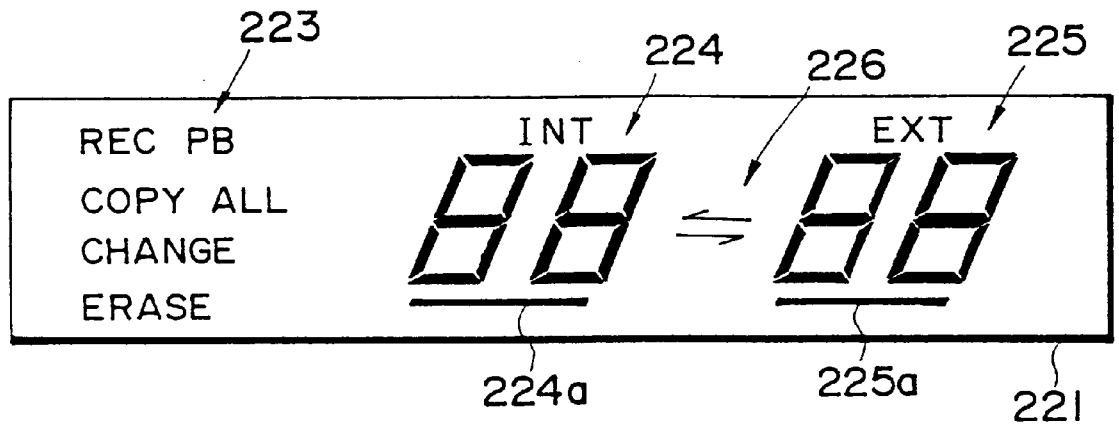
FIG. 8 is a diagram illustrating a display panel of the digital electronic still-video camera.

FIG. 8 illustrates an example of a display presented on the display panel 221. The display panel 221 is provided with a section 223 for displaying the selected mode, a section 224 for displaying information relating to the internal memory 213, a section 225 for displaying information relating to the external memory 231, and a section 226 for displaying the direction in which image data is transferred. Characters indicating the selected mode are displayed in the section 223 (the characters for all available modes are shown in the drawing of FIG. 8).

Figure 9:
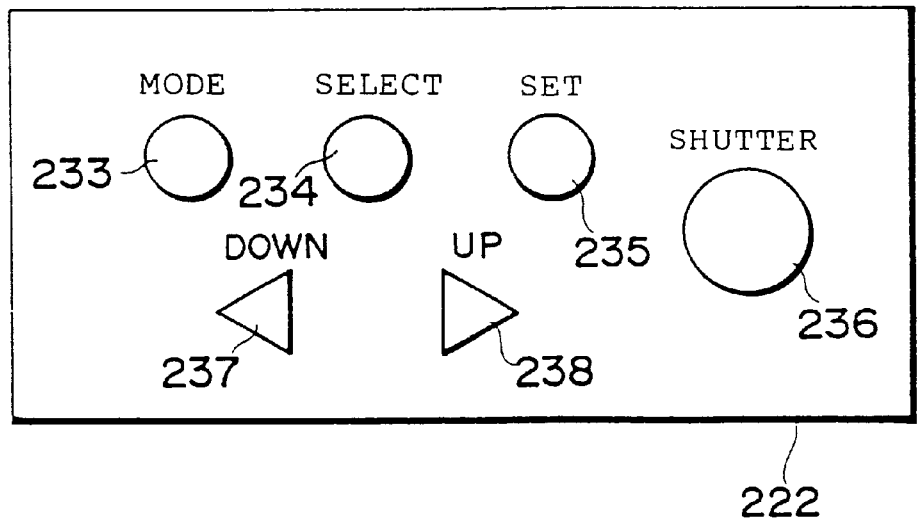
FIG. 9 is a diagram illustrating a control panel of the digital electronic still-video camera.

FIG. 9 shows a portion of the control panel 222. The control panel 222 is provided with a mode selecting button 233, a select button 234, a setting button 235, a shutter-release button 236, a DOWN button 237 for reverse feed, and an UP button 238 for forward feed.

The electronic still-video camera 200 has the following modes:

Recording Mode (REC)

In this mode, the subject is photographed and one frame of image data obtained by such photography is recorded in the internal memory 213 or external memory 231.

Playback Mode (PB)

In this mode, one designated frame of image data stored in the internal memory 213 or external memory 231 is played back.

Memory Change (or Memory Selection) Mode (CHANGE)

In this mode, it is decided whether recording or playback processing (inclusive of erasure) is to be performed with regard to the internal memory 213 or external memory 231.

Copy Mode (COPY)

In this mode, one designated frame of image data is transferred between the internal memory 213 and external memory 231 to be stored in either memory.

Copy-All Mode (COPY ALL)

In this mode, all of the stored image data is transferred between the internal memory 213 and external memory 231 to be stored in either memory.

Erase Mode (ERASE)

In this mode, designated image data is erased from the internal memory 213 or the external memory 231.

These modes can be selected by the mode selecting button 233. That is, each time the mode selecting button 233 is pressed, the mode being displayed on the on the display panel 221 changes in a predetermined order. The mode that has been selected is that represented by the characters being displayed.

The operation in each of these modes will now be described.

When the recording mode (REC) is selected, the remaining number of frames that can be recorded in the internal memory 213 and the remaining number of frames that can be recorded in the external memory 231 are displayed in the display sections 224 and 225, respectively. Further, underline segments 224a or 225a in the display section 224 or 225 corresponding to the memory (the internal memory 213 or external memory 231) that has been set in the memory change (memory selection) mode (CHANGE) are lit. In the recording mode, after one frame of image data representing the image of the subject photographed has been subjected to compression processing, the compressed data is stored in whichever of the internal memory 213 or external memory 231 has been selected, as set forth above.

In the playback mode (PB), the frame number of the image being played back is displayed in display section 224 or 225. The underline segment 224a or 225a corresponding to the memory selected is lit. The frame number of the image to be played back is incremented by pressing the UP button 238 and decremented by pressing the DOWN button 237. In the playback mode, as set forth above, the image data having the designated frame number is read from the internal memory 213 or external memory 231, depending upon which has been selected, the read image data is subjected to expansion processing and playback processing, and the resulting data is then applied to the connector 217 or viewfinder 218.

If the memory change (selection) mode (CHANGE) has been selected, whichever of the underline segments 224a, 225a is lit in display sections 224 and 225 is changed over each time the select button 234 is pressed. Lighting of the underline segment 224a indicates selection of the internal memory 213, and lighting of the underline segment 225a indicates selection of the external memory 231. When the setting button 235 is pressed, selection of the memory corresponding to the currently lit underline segment is finalized. The system controller 210 controls the selector 212 in accordance with the memory selection setting.

In the copy mode (COPY), the memory whose image data is to be read out (the originating memory from which data is to be transferred) is decided by the memory change (CHANGE) mode. Of course, since the originating memory for the transfer and the memory which is the destination of the transfer are set by setting the transfer direction, described below, this operation, along with the associated processing, is not necessarily required. The frame number of the image data to be read out in the originating memory decided is designated by operating the UP button 238 or DOWN button 237. The designated frame number is displayed in the display section 224 or 225. By pressing the select button 234, whichever of the two arrows in the display section 226 is lit is changed over. The lower arrow pointing to the right indicates a transfer from the internal memory 213 to the external memory 231, and the upper arrow pointing to the left indicates a transfer from the external memory 231 to the internal memory 213. When the shutter-release button 236 is pressed, the copying operation is executed. Specifically, one frame of the image data having the designated frame number is read out of the selected memory 213 or 231, this data is transferred to the other memory 231 or 213 through the selector 212, and the transferred data is stored in a blank area of the memory. It is permissible to adopt an arrangement in which the storage location or frame number of the image data in the destination memory is designated. If it is arranged so that this transfer is carried out while the image data to be transferred is being displayed, the user will be capable of ascertaining which image data is being transferred.

In the copy-all mode (COPY ALL), the transfer direction is decided by pressing the select button 234, and the arrow indicating the direction decided is displayed in the display section 226, just as described above. When the shutter-release button 236 is pressed, all of the image data stored in the originating memory is read out, and this data is transferred to and stored in the destination memory via the selector 212.

In the erase mode (ERASE), the memory storing the image data to be erased is selected in the memory change (selection) mode, after which the frame number of the image data to be erased is designated using the UP button 238 or DOWN button 237. The image data having the designated frame number is erased by pressing the shutter-release button 236.

In accordance with the electronic still-video camera according to the third embodiment as described above, compressed image data indicative of a photographic image can be preserved in the internal memory 213, and hence it is not always necessary to carry about a memory cartridge, just as in the case of the first embodiment. In addition, the image data preserved in the internal memory 213 can be played back and displayed and, if necessary, the image data can be transferred to and stored in the external memory of a memory cartridge.

Fourth Embodiment

Figure 10:
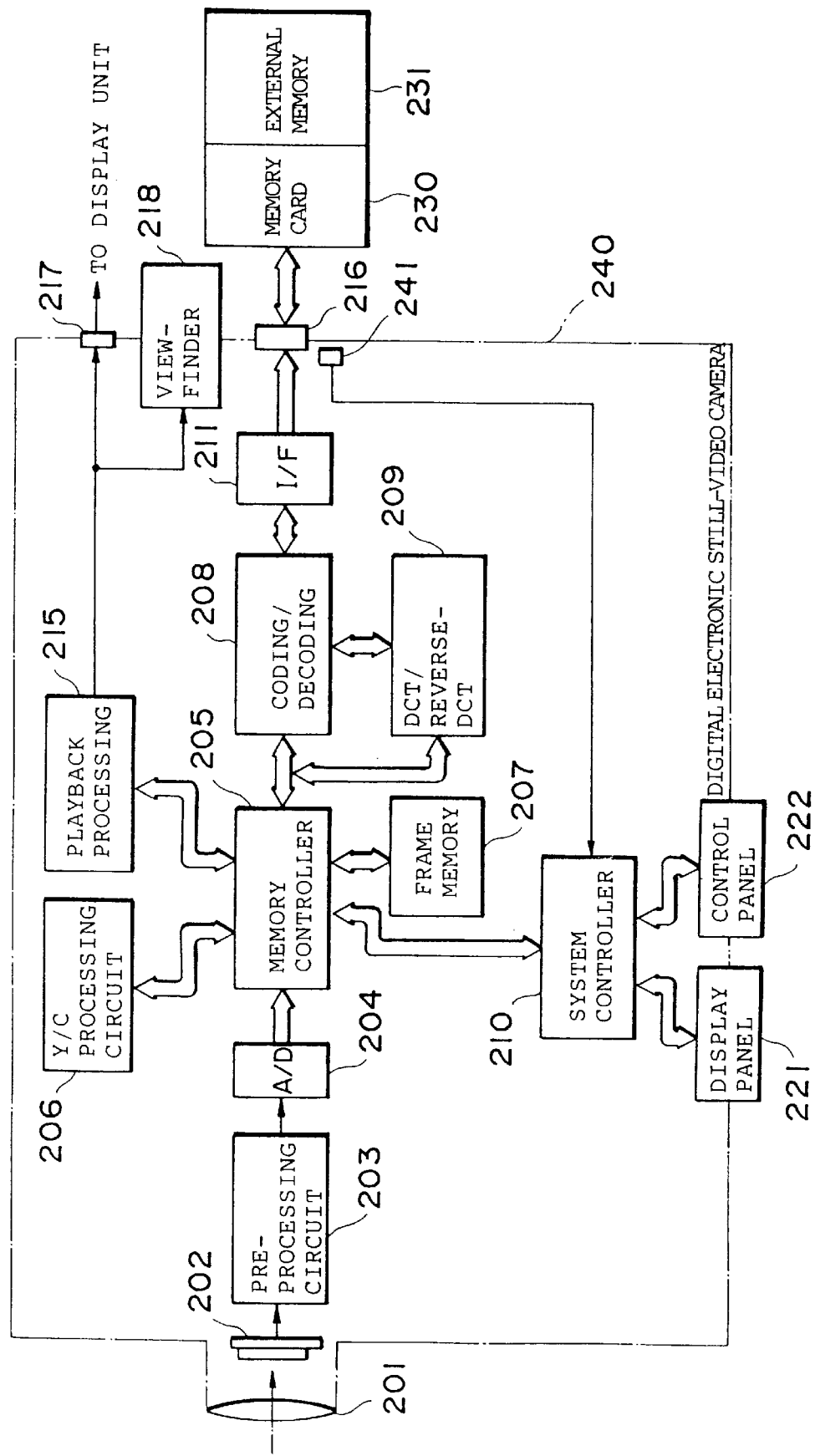
FIG. 10 is a block diagram illustrating the electrical construction of a digital electronic still-video camera according to a fourth embodiment of the present invention.

FIG. 10 illustrates the construction of a digital electronic still-video camera according to a fourth embodiment of the present invention.

An electronic still-video camera 240 according to the fourth embodiment differs from the. electronic still-video camera 200 of the third embodiment shown in FIG. 7 in that the selector 212 and internal memory 213 are not provided. The other components basically are the same as those in the electronic still-video camera 200 of the third embodiment.

In FIG. 10, there is illustrated a switch 241 for detecting loading and ejection of a memory card 230 (connection to and disconnection from the connector 216). Though the memory-card detecting switch 241 is provided also in the electronic still-video camera 200 of the third embodiment, it is not shown in the drawing of FIG. 7.

The memory-card detecting switch 241 can be realized by a switch whose contacts are opened and closed by making contact with the loaded memory card 230, or by processing executed by the system controller 210 in accordance with a program. The latter alternative will now be described in detail.

Figure 12:
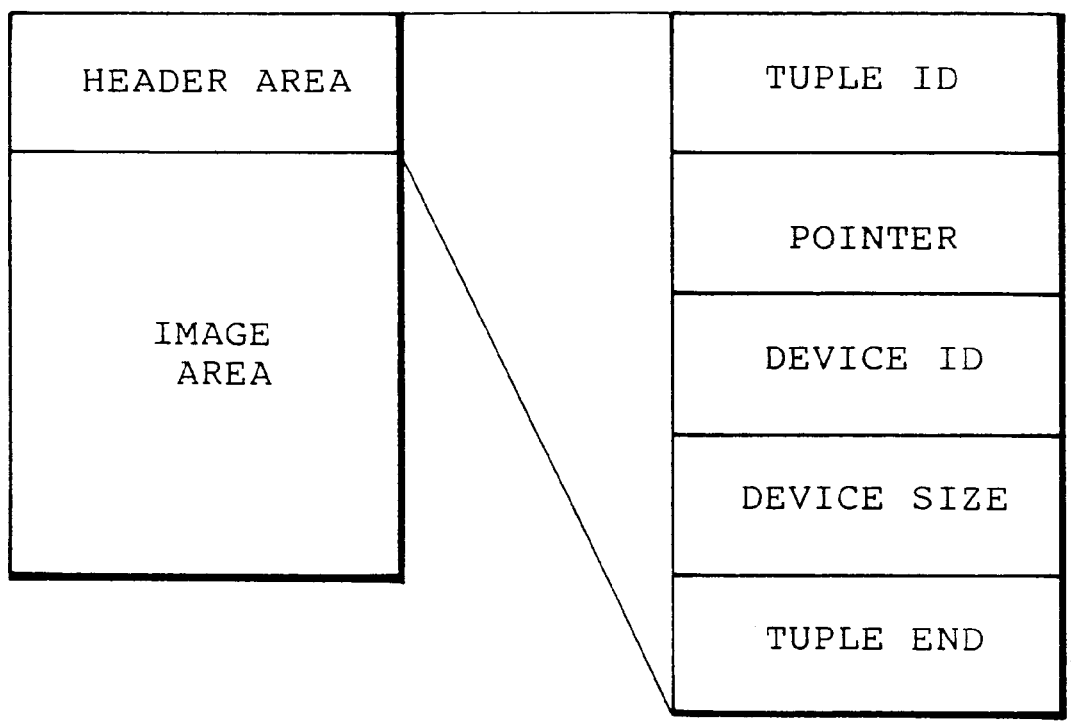
FIG. 12 is a diagram showing various areas of an external memory that are contained in a memory card.

As illustrated in FIG. 12, the storage area of the external memory 231 in the memory card 230 is divided into a header area and an image area which stores the image data. Recorded in the header area are a tuple ID (identification), which is an identification code indicating that the memory card is for a digital electronic still-video camera; a pointer indicating the data length of the tuple ID; a device ID indicating the speed and type of the external memory 231; device-size data which indicates the capacity of the external memory; and a tuple end code (generally FFh is used, in which h is indicative of a hexadecimal number) indicating the end of the tuple. The system controller 210 addresses the area of the device ID in the header area of the memory card 230 and reads the data stored in this area. If the memory card 230 has been connected to the connector 216, the device ID is read. The device ID generally is data other than OOh. Therefore, if the read data is other than OOh, the system controller 210 renders a decision to the effect that the memory card 230 has been connected to the connector 216. Since the data bus has been pulled down to the L level, the read data will be OOh as the memory card 230 has not been connected. In this case, the system controller 210 decides that the memory card 230 has not been loaded.

In the digital electronic still-video camera 240 of the fourth embodiment, it is possible to photograph at least one more frame even if the image area of the external memory 231 in memory card 230 has been filled to capacity with image data and storage of any additional image data is impossible, or even if the memory card 230 has not been loaded.

Figure 11:
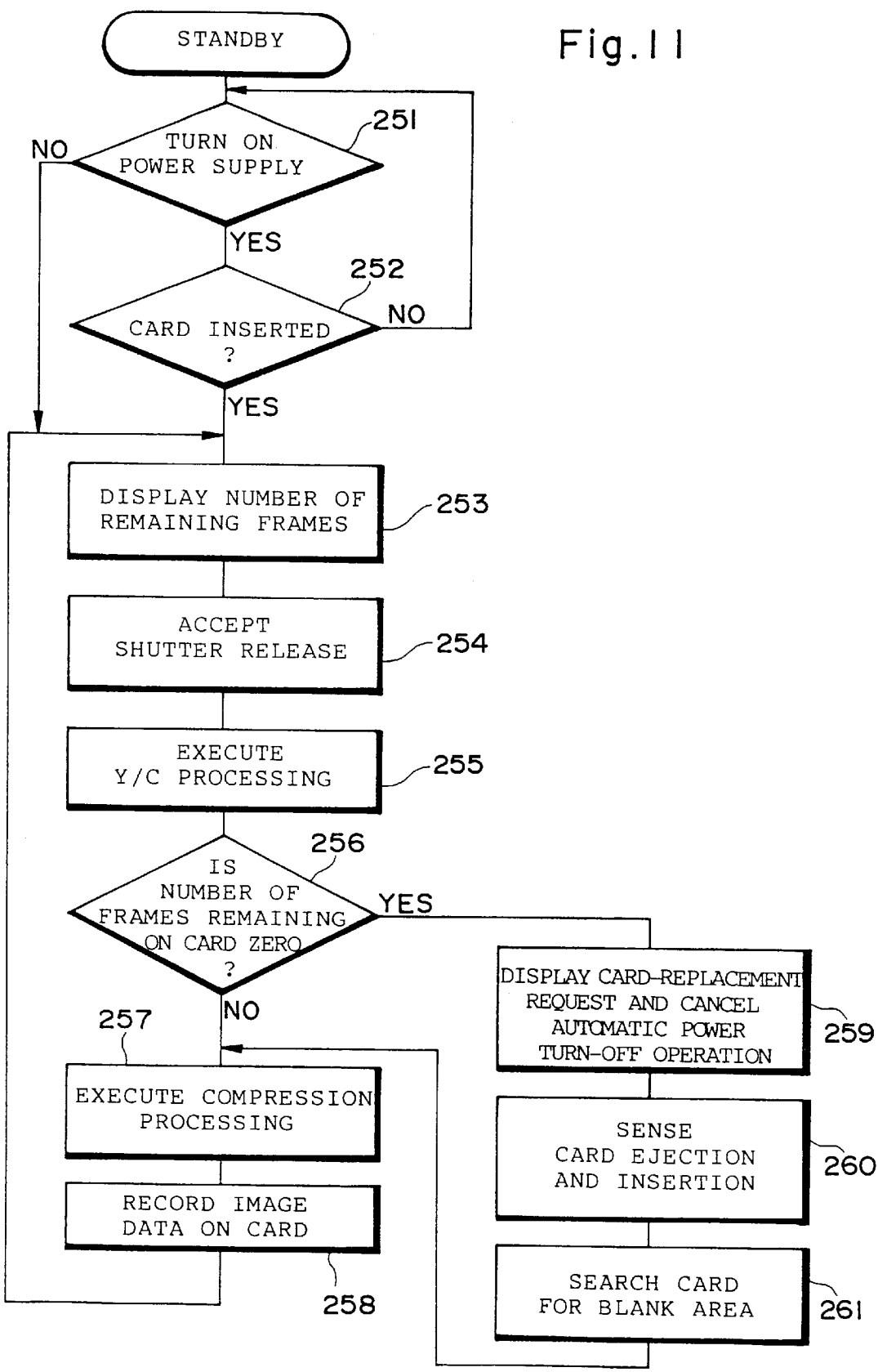
FIG. 11 is a flowchart illustrating the operation of the digital electronic still-video camera.

Reference will be had to FIG. 11 to describe the processing which makes photography possible even when the image area of the external memory 231 in memory card 230 has been filled to capacity with image data. This processing is executed mainly by the system controller 210.

When the power supply is turned on at step 251 and the memory card 230 is inserted (connected), this is sensed by the detecting switch 241 at step 252.

If the memory card 230 has been connected to the connector 216, the data in the header area and in the other required areas of the external memory 231 is read, the capacity of the blank area of external memory 231 or the number of already recorded frames is determined based upon the read data, and the number of remaining frames capable of being recorded on the memory card 230 is obtained. The remaining number of frames is displayed on the display panel 221 (step 253).

Irrespective of whether the number of remaining frames is zero or some other number, depression of the shutter-release button is allowed unconditionally. If the shutter-release button is pressed, the image data obtained by photography is stored in the frame memory 207 at step 254. Processing for producing luminance (Y) data and color (C) data from the image data obtained is executed by the Y/C processing circuit 206, and the luminance data and color data obtained as a result is stored in the frame memory 207 again at step 255.

After this Y/C processing, it is determined at step 256 whether the number of remaining frames previously detected is zero, namely whether compressed image data is no longer capable of being recorded on the memory card 230.

If the memory card 230 has a blank area in which recording is still possible, namely if the number of remaining frames is not zero, image-data compression processing by DCT and coding is executed at step 257, and the compressed image data is recorded in the external memory 231 of memory card 230 at step 258. The program then returns to step 253.

In a case where the number of frames remaining in memory card 230 is zero, image data can no longer be recorded in the memory card 230. Accordingly, the display panel 221 displays a message calling for the memory card 230 to be exchanged for a new memory card, and an automatic power turn-off operation is cancelled at step 259. The automatic power turn-off operation refers to processing for turning off the main power supply automatically if, after a picture is taken, a prescribed period of time elapses without a picture being taken again. When the operating power ceases being supplied, the image data (Y, C data) that has been preserved in the frame memory 207 is erased.

When the user exchanges a full memory card for a new memory card or for one having a blank area in which at least one frame of image data can be recorded, ejection of the full memory card and loading of the new memory card are detected by the detecting switch 241 at step 260.

Thereafter, if the system controller 210 accesses the external memory 231 of the newly loaded memory card 230 and, at step 261, finds a blank area in which image data is capable of being recorded, the luminance data and color data preserved in the frame memory 207 is compressed at a predetermined compression ratio at step 257, after which the compressed data is recorded on the new memory card at step 258. If the newly loaded memory card 230 does not have a blank area, a message is displayed and prompts the user to exchange the memory card for another again. The compression ratio in the processing for compressing the image data may be set automatically or manually by using the control panel 222.

In order to make photography possible even if no memory card has been loaded, the program proceeds to step 253 for display of the remaining number of frames, step 254 for shutter release and step 255 for Y/C processing even when a NO answer is received at step 252. The image data resulting from Y/C processing is preserved in the frame memory 207. If the memory card is not subsequently inserted, a message calling for card insertion is displayed and automatic power-off is cancelled, just as at step 259. After insertion of the memory card has been sensed, the inserted memory card is searched for a blank area, in a similar manner as in steps 260 and 261. If a blank area exists, it will suffice to compress the image data preserved in frame memory 207 and write the compressed data in the memory card, in a similar manner as in steps 257 and 258.

Thus, when it is desired to perform photography beyond the fixed number of frames allowed by a memory card, at least one frame can be preserved temporarily, irrespective of the compression ratio, by utilizing the frame memory which is an essential component in the digital signal processing executed within a digital electronic still-video camera. Further, even if no memory card has been inserted, the image data resulting from photography can be preserved temporarily in the frame memory. Then, when a new memory card is loaded in the camera, the camera operates in such a manner that the temporarily preserved image data is recorded on this memory card. This makes the camera much more convenient for the user.

As many apparently widely different embodiments of the present invention can be made without departing from the spirit and scope thereof, it is to be understood that the invention is not limited to the specific embodiments thereof except as defined in the appended claims.

What is claimed is:

1. An electronic still-video camera comprising:
    image pick-up device for picking up an image of a subject and outputting a video signal representing the image of the subject obtained;
    recording signal processor, including a frame memory, for converting the video signal outputted by said image pick-up device into digital image data suited for storage in a memory device, and for compressing the digital image data;
    a connector, in and from which a first memory cartridge is capable of being loaded and unloaded at will, said first memory cartridge incorporating an external memory for storing the compressed image data;
    a sensor for sensing that the first memory cartridge has been connected to said connector;
    determining device for determining that compressed image data can no longer be recorded in the first memory cartridge connected to said connector;
    a display for displaying a message requesting replacement of the first memory cartridge in response to the determining device determining that compressed image data can no longer be recorded in the first memory cartridge,
    wherein, said sensor senses unloading of the first memory cartridge after display of the message and senses loading of a second memory cartridge after sensing unloading of the first memory cartridge;
    a controller, after the digital image data has been stored temporarily in the frame memory and subsequent to the sensor sensing the loading of the second memory cartridge, for confirming that the second memory cartridge includes available memory storage space, and for controlling the writing of the digital image data from the frame memory to the second memory cartridge upon confirming that the second memory cartridge includes available memory storage space; and
    a device for cancelling automatic turn-off of power in response to the message requesting replacement of the first memory cartridge being displayed by said display.

2. The camera according to claim 1, wherein said recording signal processor includes:
    a Y/C processing circuit for generating luminance data and color data from the digital image data; and
    a compressing circuit for compressing the digital image data after the digital image data has been subjected to Y/C processing by said Y/C processing circuit;
    said digital image data, which is subjected to Y/C processing, being temporarily stored in the frame memory;
    said controller controlling means performing after available memory storage space in the second memory cartridge has been confirmed, the compression of the digital image data and the writing of the compressed digital image data into the second memory cartridge.

3. An electronic still-video camera comprising:
    image pick-up device for picking up an image of a subject and outputting a video signal representing the image of the subject obtained;
    recording signal processor, including a frame memory, for converting the video signal outputted by said image pick-up device into digital image data suited for storage in a memory device, and for compressing the digital image data;
    a connector, in and from which a memory cartridge is capable of being loaded and unloaded at will, said memory cartridge incorporating an external memory for storing the compressed image data;
    a sensor for sensing that the memory cartridge has been connected to said connector;
    a display for displaying a message requesting connection of the memory cartridge in response to the sensor sensing that the memory cartridge fails to be connected to the connector;
    a controller, after the digital image data has been stored temporarily in the frame memory and subsequent to the sensor sensing the connection of the memory cartridge to the connector, for confirming that the connected memory cartridge includes available memory storage space, and for controlling the writing of the digital image data from the frame memory to the connected memory cartridge upon confirming that the connected memory cartridge includes available memory storage space; and a device for cancelling automatic turn-off of power in response to the message requesting connection of the memory cartridge being displayed by said display.

4. The camera according to claim 3, wherein said recording signal processor includes:

a Y/C processing circuit for generating luminance data and color data from the digital image data; and a compressing circuit for compressing the digital image data after the digital image data has been subjected to Y/C processing by said Y/C processing circuit;

said digital image data subjected to Y/C processing being temporarily stored in the frame memory;

said controller controlling after available memory storage space in the connected memory cartridge has been confirmed, the compression of the digital image data and the writing of the compressed digital image data into said connected memory cartridge.

* * * * *